United States Patent
Segal et al.

(10) Patent No.: US 11,436,713 B2
(45) Date of Patent: Sep. 6, 2022

(54) APPLICATION ERROR ANALYSIS FROM SCREENSHOT

(71) Applicant: International Business Machines Corporation, Armonk, NY (US)

(72) Inventors: Benjamin P. Segal, Hyde Park, NY (US); James William Murdock, IV, Amawalk, NY (US); Radha Mohan De, Howrah (IN); Sujoy Roy, Kolkata (IN); John Martin Prager, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 16/795,432

(22) Filed: Feb. 19, 2020

(65) Prior Publication Data

US 2021/0256681 A1 Aug. 19, 2021

(51) Int. Cl.
*G06T 7/00* (2017.01)
*G06T 7/11* (2017.01)
(Continued)

(52) U.S. Cl.
CPC ............. *G06T 7/0002* (2013.01); *G06N 5/02* (2013.01); *G06N 20/00* (2019.01); *G06T 3/40* (2013.01);
(Continued)

(58) Field of Classification Search
CPC . G06T 2207/20081; G06T 2207/20132; G06T 3/40; G06T 7/11; G06T 7/0002;
(Continued)

(56) References Cited

U.S. PATENT DOCUMENTS

| 8,261,200 B2 | 9/2012 | Denoue et al. |
| 8,373,724 B2 | 2/2013 | Ratnakar et al. |

(Continued)

FOREIGN PATENT DOCUMENTS

| CN | 104796278 A | 7/2015 |
| CN | 105573897 A | 5/2016 |
| KR | 20120042184 A | 5/2012 |

OTHER PUBLICATIONS

Mell, P., et al., "The NIST Definition of Cloud Computing", National Institute of Standards and Technology Special Publication 800-145, Sep. 2011, pp. 1-7, U.S. Department of Commerce, United States.

(Continued)

*Primary Examiner* — Margaret G Mastrodonato
(74) *Attorney, Agent, or Firm* — Sherman IP LLP; Kenneth L. Sherman; Steven Laut

(57) ABSTRACT

A method for determining an application error from a screenshot includes receiving, by a computing device, a computer application screenshot image indicating a computer error has occurred. The computing device analyzes the computer application screenshot image using a machine learning image analysis to determine one or more error regions in the computer application screenshot image. The computing device further processes the analyzed computer application screenshot to extract text from the one or more error regions in the computer application screenshot image. The computing device determines the application error based upon the extracted text. The computing device further automatically applies an automated error fix based upon the determined application error.

20 Claims, 19 Drawing Sheets

(51) Int. Cl.
*G06T 3/40* (2006.01)
*G06N 5/02* (2006.01)
*G06N 20/00* (2019.01)
*G06V 20/62* (2022.01)
*G06V 30/10* (2022.01)

(52) U.S. Cl.
CPC ............... *G06T 7/11* (2017.01); *G06V 20/62* (2022.01); *G06T 2207/20081* (2013.01); *G06T 2207/20132* (2013.01); *G06V 30/10* (2022.01)

(58) Field of Classification Search
CPC ............ G06N 20/00; G06N 3/08; G06N 5/02; G06V 30/413; G06V 20/62; G06V 30/10; G06V 30/412
See application file for complete search history.

(56) References Cited

U.S. PATENT DOCUMENTS

| | | | |
|---|---|---|---|
| 8,719,945 B2 | 5/2014 | Birtwhistle | |
| 9,983,870 B2 | 5/2018 | Hsu | |
| 10,019,823 B2* | 7/2018 | Lin | G06T 3/0012 |
| 2010/0283800 A1* | 11/2010 | Cragun | G09B 21/008 |
| | | | 345/661 |
| 2010/0331043 A1 | 12/2010 | Chapman et al. | |
| 2011/0130956 A1 | 6/2011 | Tracton et al. | |
| 2014/0237304 A1 | 8/2014 | Lai | |
| 2014/0365203 A1* | 12/2014 | Waibel | G06F 40/58 |
| | | | 704/2 |
| 2015/0178388 A1* | 6/2015 | Winnemoeller | G06Q 50/01 |
| | | | 707/722 |
| 2015/0379343 A1* | 12/2015 | Powell | G06V 30/416 |
| | | | 382/229 |
| 2016/0224851 A1* | 8/2016 | Yesugade | G06V 20/582 |
| 2017/0052983 A1 | 2/2017 | Pearlman | |
| 2019/0108486 A1* | 4/2019 | Jain | H04L 63/1433 |
| 2019/0129823 A1 | 5/2019 | Pell | |
| 2020/0074169 A1* | 3/2020 | Mukhopadhyay | G06Q 50/18 |
| 2021/0073984 A1* | 3/2021 | Locke | G06T 7/0012 |

OTHER PUBLICATIONS

Maciulis, V., "How to leverage machine learning screenshot recognition to identify an application failed state," Devbridge, Aug. 1, 2019, pp. 1-6, downloaded Feb. 19, 2020, https://www.devbridge.com/articles/how-to-leverage-machine-learning-screenshot-recognition-to-identify-an-application-failed-state/, United States.

Applitools, downloaded Feb. 19, 2020, https://applitools.com/, pp. 4-8, California, United States.

Ng, R., "Machine Learning Photo OCR," downloaded Feb. 19, 2020, https://www.ritchieng.com/machine-learning-photo-ocr/, pp. 1-11, United States.

Sarshogh, R. et al., "Learning to Read: Computer Vision Methods for Extracting Text from Images," downloaded Feb. 19, 2020, https://medium.com/capital-one-tech/learning-to-read-computer-vision-methods-for-extracting-text-from-images-2ffcdae11594, Capital One Tech, United States.

Singh Chandel, V. et al., "Deep Learning based Text Recognition (OCR) using Tesseract and OpenCV," Jun. 6, 2018, downloaded Feb. 19, 2020, https://www.learnopencv.com/deep-learning-based-text-recognition-ocr-using-tesseract-and-opencv/, pp. 1-20, United States.

Robust Reading, "Overview—ICDAR2017 Robust Reading Challenge on COCO-Text", downloaded Feb. 19, 2020, https://rrc.cvc.uab.es/?ch=5, 2017, pp. 1-3, United Sates.

Forson, E. et al., Recognising Traffic Signs With 98% Accuracy Using Deep Learning, Aug. 23, 2017, pp. 1-19 downloaded Feb. 19, 2020, https://towardsdatascience.com/recognizing-traffic-signs-with-over-98-accuracy-using-deep-learning-86737aedc2ab, Medium, United Sates.

* cited by examiner

Receiving, By A Computing Device, A Computer Application Screenshot Image Indicating A Computer Error Has Occurred
1910

Analyzing, By The Computing Device, The Computer Application Screenshot Image Using A Machine Learning Image Analysis To Determine One Or More Error Regions In The Computer Application Screenshot Image

1920

Processing, By The Computing Device, The Analyzed Computer Screenshot To Extract Text From The One Or More Error Regions In The Computer Application Screenshot Image
1930

Determining, By The Computing Device, The Application Error Based Upon The Extracted Text
1930

Automatically Applying, By The Computing Device, An Automated Error Fix Based Upon The Determined Application Error

APPLICATION ERROR ANALYSIS FROM SCREENSHOT

BACKGROUND

The field of embodiments of the present invention relate to determining an application error from a screenshot using machine learning image analysis.

In today's day and age, the information technology application support teams very often face challenges in describing the error they face at the software application level during an application outage or erroneous behavior of an application. In general, customer support staff create a note in incident reporting tools, where they need to describe the error as best as possible—correct, concise error description is a pre-requisite for a quick, quality fix.

One problem, however, is the lack of the application knowledge to describe the application error, which often varies in the initial error note and is more difficult for a resolution team to resolve. This gap in communication and resolution process results in a delayed/incorrect resolution, which in turn, adversely affects a business.

SUMMARY

Embodiments relate to determining an application error from a screenshot using machine learning image analysis. One embodiment provides a method for determining an application error from a screenshot includes receiving, by a computing device, a computer application screenshot image indicating a computer error has occurred. The computing device analyzes the computer application screenshot image using a machine learning image analysis to determine one or more error regions in the computer application screenshot image. The computing device further processes the analyzed computer application screenshot image to extract text from the one or more error regions in the computer application screenshot image. The computing device determines the application error based upon the extracted text. The computing device further automatically applies an automated error fix based upon the determined application error. Other embodiments include a computer program product for determining an application error from a screenshot, and an apparatus including a memory for storing instructions and a processor configured to execute the instructions. These features contribute to the advantage of overcoming the gap in the communication and resolution process that typically results in delayed/incorrect application error resolution The features further contribute to the advantage using image analysis techniques with intelligence in specific application software to manifest the correct error information for an application from its screenshot to automate problem resolution.

One or more of the following features may be included. In some embodiments, the machine learning image analysis may include constructing an image classifier model that checks that the received computer application screenshot image is a valid error screenshot pertaining to a particular error category.

In some embodiments, the machine learning image analysis may still further include performing a visual inspection process including creating a model using machine learning image segmentation to identify and locate a position of an error boundary marker within the one or more error regions of the received computer application screenshot image.

In some embodiments, the machine learning image analysis may yet further include locating a relative position of error text using the model based on a given location of the error boundary marker.

In some embodiments, the machine learning image analysis may further include applying computer vision techniques to detect a crop region containing the error text.

In some embodiments, the machine learning image analysis may still further include developing a knowledge model to suggest an optimal mix of image enhancement, noise cancellation, and an amplification factor to improve a final optical character recognition (OCR) result for the error text.

In some embodiments, the method may additionally include locating a center of the error boundary marker, identifying an orientation of the error text relative to the error boundary marker, identifying the crop region of the error text; determining a processing technique and enhancement factors to apply enhancements on the crop region, cropping the crop region and applying the enhancements; and passing the computer application screenshot image through OCR to obtain the error text.

In some embodiments, the method may further include determining whether a prediction accuracy meets a required accuracy threshold level, performing a screenshot magnification process to the error text that increases a content size for clarity to augment image visibility, determining whether the error text with increased content size is detected, and if the error text is not detected, automatically receive another computer application screenshot image.

These and other features, aspects and advantages of the present embodiments will become understood with reference to the following description, appended claims and accompanying figures.

BRIEF DESCRIPTION OF THE DRAWINGS

FIG. 12 is an example screenshot showing a no entry exist error for selection criteria, according to one embodiment;

FIG. 19 illustrates a block diagram of a process for determining an application error from a screenshot based on machine learning image analysis, according to one embodiment.

DETAILED DESCRIPTION

Figure 1:
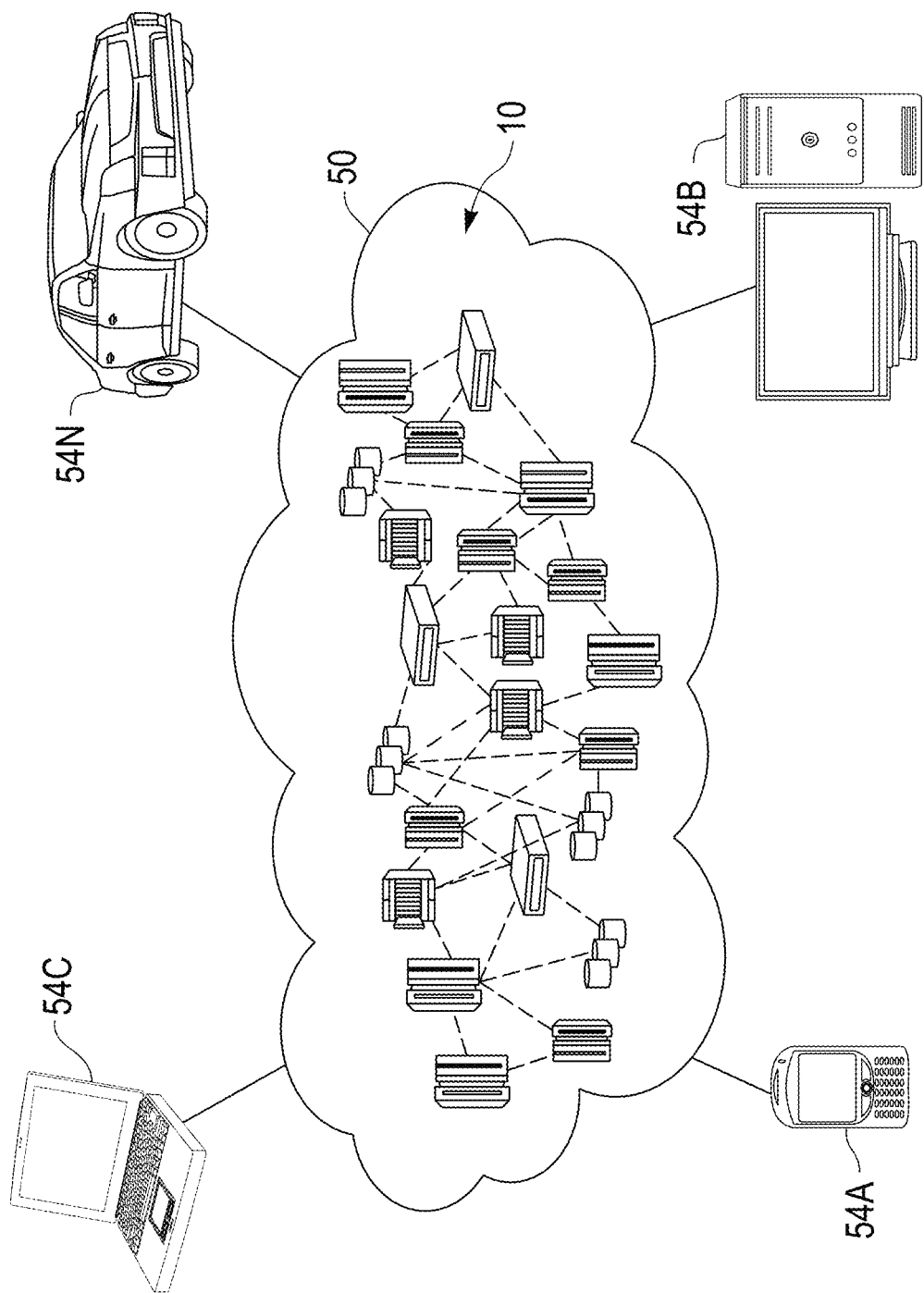
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments relate to determining an application error from a screenshot using machine learning image analysis. One embodiment provides a method for determining an application error from a screenshot that includes receiving, by a computing device, a computer application screenshot image indicating a computer error has occurred. The computing device analyzes the computer application screenshot image using a machine learning image analysis to determine one or more error regions in the computer application screenshot image. The computing device further processes the analyzed computer application screenshot image to extract text from the one or more error regions in the computer application screenshot image. The computing device determines the application error based upon the extracted text. The computing device further automatically applies an automated error fix based upon the determined application error. Other embodiments include a computer program product for determining an application error from a screenshot, and an apparatus including a memory for storing instructions and a processor configured to execute the instructions. The method may further include that the machine learning image analysis may include constructing an image classifier model that checks that the received computer application screenshot image is a valid error screenshot pertaining to a particular error category. The method may additionally include that the machine learning image analysis includes performing a visual inspection process including creating a model using machine learning image segmentation to identify and locate a position of an error boundary marker within the one or more error regions of the received computer application screenshot image. The method may still further include that the machine learning image analysis includes locating a relative position of error text using the model based on a given location of the error boundary marker. The method may yet further include that the machine learning image analysis includes applying computer vision techniques (e.g., processes that work on enabling computing devices to see, identify and process images in the same or similar way that human vision does, and then provide appropriate output) to detect a crop region containing the error text. The method may also include that the machine learning image analysis includes developing a knowledge model to suggest an optimal mix of image enhancement, noise cancellation, and an amplification factor to improve a final optical character recognition (OCR) result for the error text. The method may additionally further include locating a center of the error boundary marker, identifying an orientation of the error text relative to the error boundary marker, identifying the crop region of the error text; determining a processing technique and enhancement factors to apply enhancements on the crop region, cropping the crop region and applying the enhancements; and passing the computer application screenshot image through OCR to obtain the error text. The method may yet further include determining whether a prediction accuracy meets a required accuracy threshold level, performing a screenshot magnification process to the error text that increases a content size for clarity to augment image visibility, determining whether the error text with increased content size is detected, and if the error text is not detected, automatically receive another computer application screenshot image. These features contribute to the advantage of overcoming the gap in the communication and resolution process that typically results in delayed/incorrect application error resolution The features further contribute to the advantage using image analysis techniques with intelligence in specific application software to manifest the correct error information for an application from its screenshot to automate problem resolution.

It is understood in advance that although this disclosure includes a detailed description of cloud computing, implementation of the teachings recited herein are not limited to a cloud computing environment. Rather, embodiments of the present embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
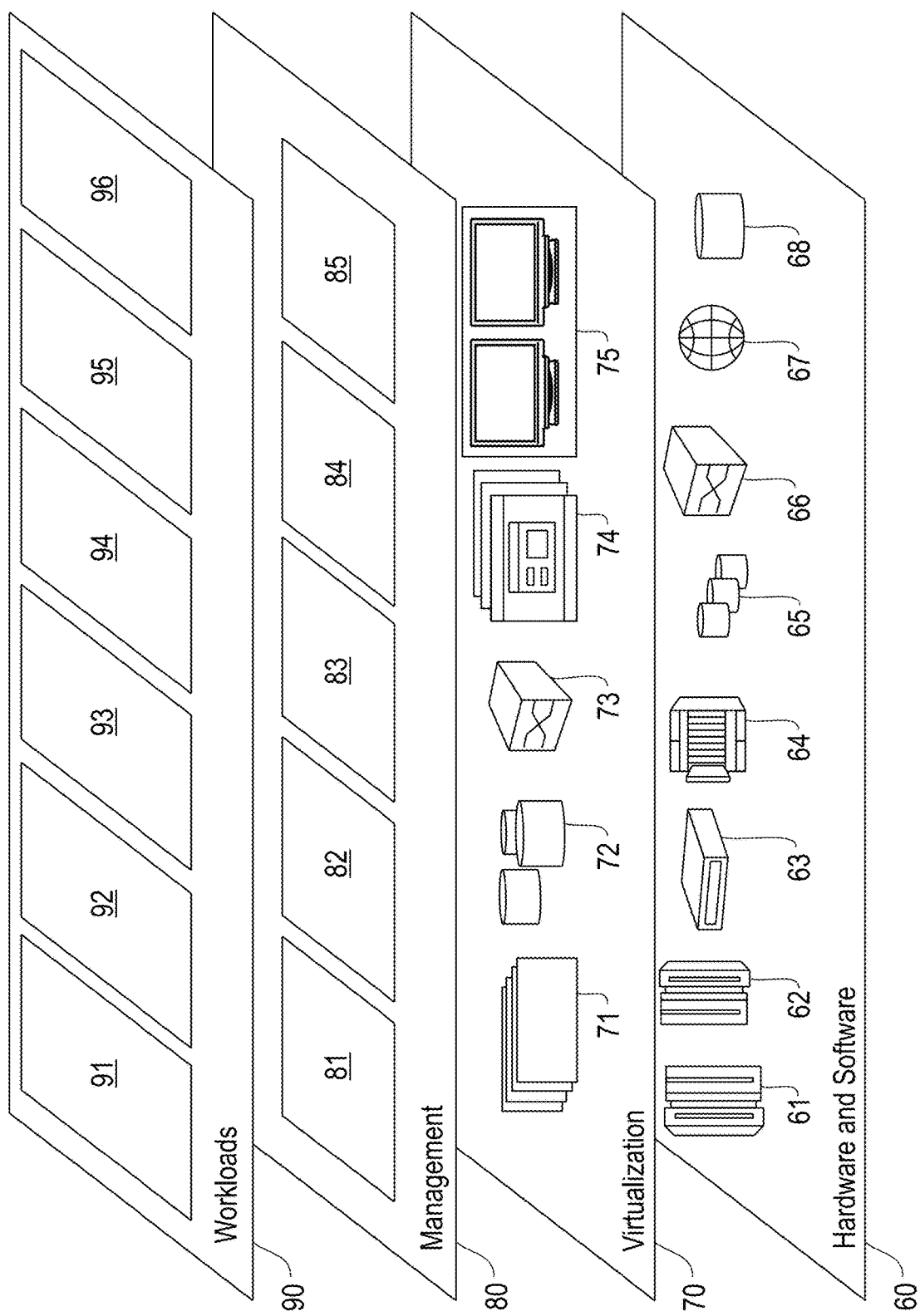
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and determining an application error from a screenshot using machine learning image analysis processing 96 (see, e.g., system 500, FIG. 5, flow 600, FIG. 6, process 1900, FIG. 19). As mentioned above, all of the foregoing examples described with respect to FIG. 2 are illustrative only, and the embodiments are not limited to these examples.

It is reiterated that although this disclosure includes a detailed description on cloud computing, implementation of the teachings recited herein are not limited to a cloud computing environment. Rather, the embodiments may be implemented with any type of clustered computing environment now known or later developed.

Figure 3:
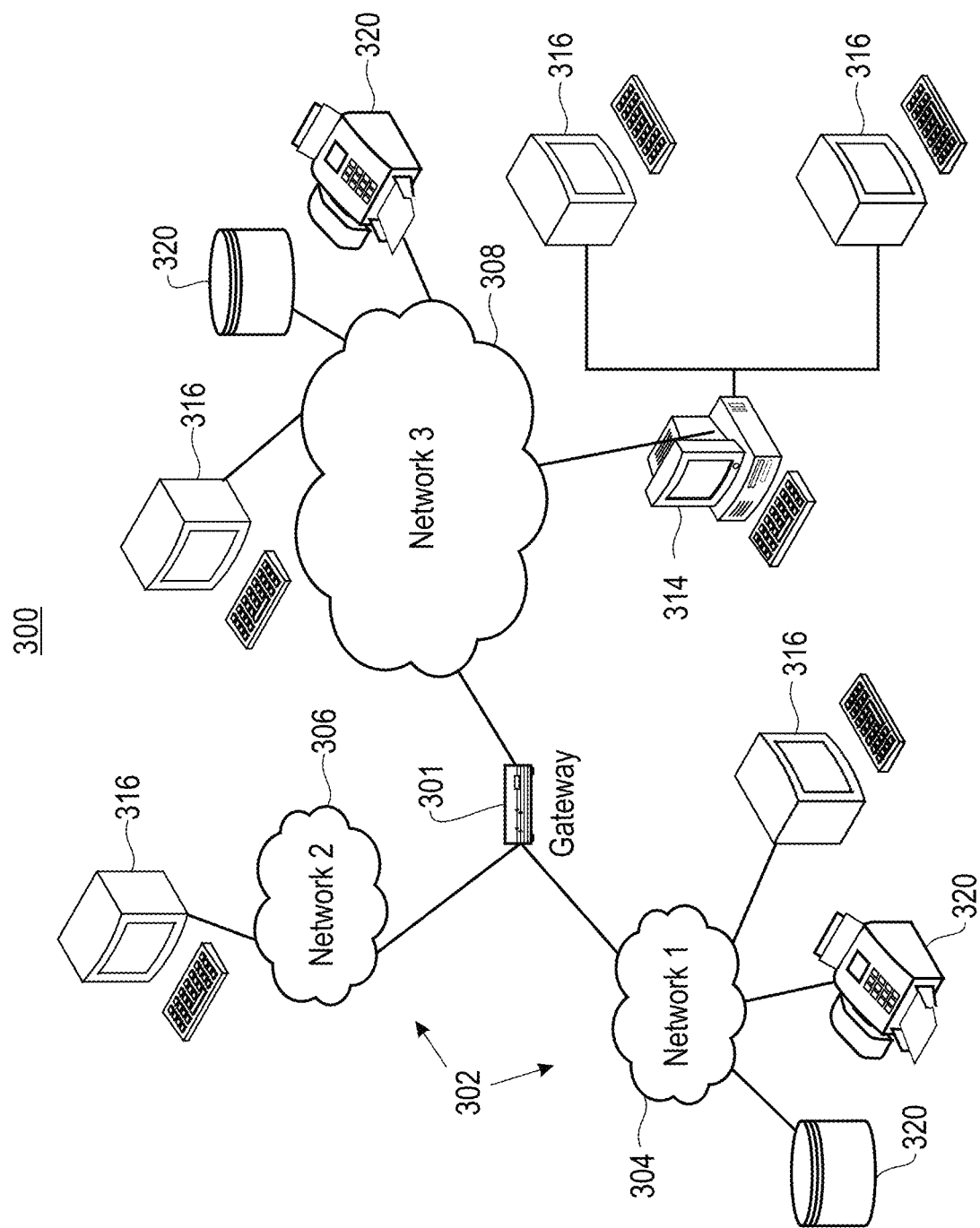
FIG. 3 is a network architecture of a system for determining an application error from a screenshot based on machine learning image analysis processing, according to an embodiment.

FIG. 3 is a network architecture of a system 300 for determining an application error from a screenshot using machine learning image analysis processing, according to an embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 316 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX® system that emulates an IBM® z/OS environment, a UNIX® system that virtually hosts a MICROSOFT® WINDOWS® environment, a MICROSOFT® WINDOWS® system that emulates an IBM® z/OS environment, etc. This virtualization and/or emulation may be implemented through the use of VMWARE software in some embodiments.

Figure 4:
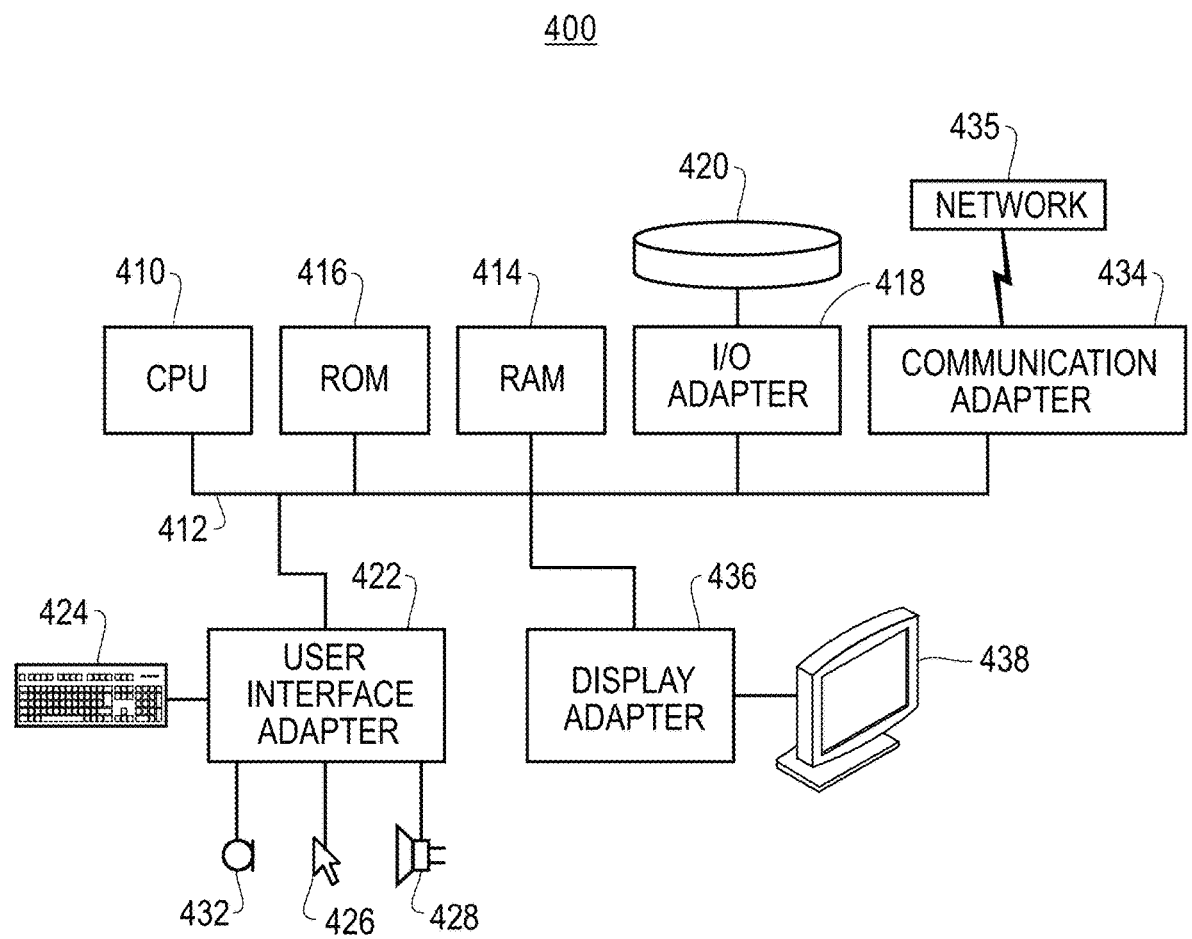
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT® WINDOWS® Operating System (OS), a MAC OS®, a UNIX® OS, etc. In one embodiment, the system 400 employs a POSIX® based file system. It will be appreciated that other examples may also be implemented on platforms and operating systems other than those mentioned. Such other examples may include operating systems written using JAVA®, XML, C, and/or C++ language, or other programming languages, along with an object oriented programming methodology. Object oriented programming (OOP), which has become increasingly used to develop complex applications, may also be used.

Figure 5:
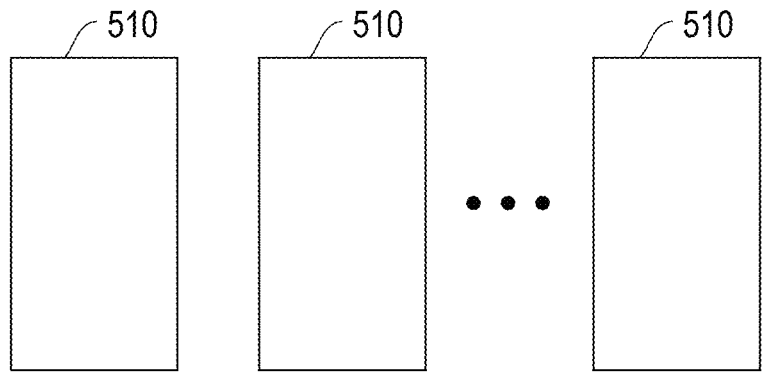
FIG. 5 is a block diagram illustrating a distributed system for determining an application error from a screenshot based on machine learning image analysis processing, according to one embodiment.
Figure 5:
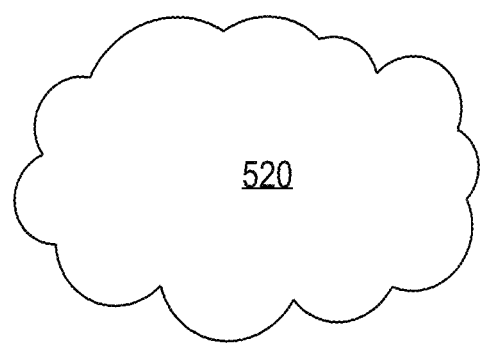
Figure 5:
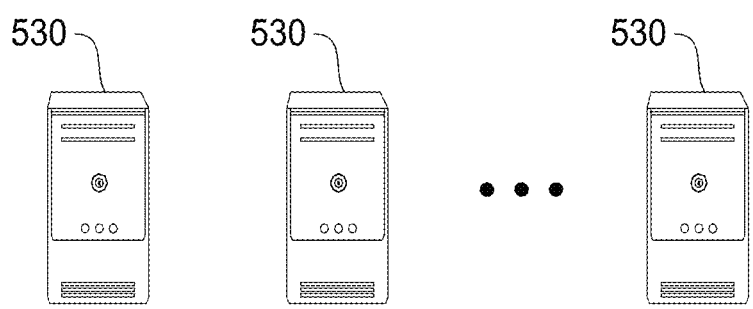

FIG. 5 is a block diagram illustrating a distributed system 500 for determining an application error from a screenshot using machine learning image analysis processing, according to one embodiment. In one embodiment, the system 500 includes client devices 510 (e.g., mobile devices, smart devices, computing systems, etc.), a cloud or resource sharing environment 520 (e.g., a public cloud computing environment, a private cloud computing environment, a data center, etc.), and servers 530. In one embodiment, the client devices 510 are provided with cloud services from the servers 530 through the cloud or resource sharing environment 520.

Conventional techniques capture text from images and take necessary actions based on the text translation. One problem with these conventional techniques is that the success rate of such conversion methods depend largely on the accuracy of screenshot making, which needs to follow certain advisories to meet a high success rate. In the case of application error stack reading, image-to-text extraction methodology requires a lot of prior analysis to extract the exact error text from an image and that too, has limited success for a small set of images having identical features (size, format, color, resolution, etc.). Another problem is that it is very unlikely to expect a planned ideal screenshot from an application support team since they expect human eye scanning over their screenshot to predict errors and offer resolutions, and therefore the quality of a screenshot may not be that much qualified to solve the problem.

As the saying goes, "a picture is worth a thousand words." One embodiment for determining an application error from a screenshot using machine learning image analysis processing may be applicable in application support as well, where people engaged in application support can easily capture a screenshot for error information and attach it during incident reporting. A resolution team then reads the same and can strategize the fix much faster than asking questions about the error with communication gaps in between. One embodiment solves the problem as error text extraction happens through dynamic discovery of error markers, which enables intelligent selection of a crop boundary containing only the error text and applied further enhancing techniques (e.g., noise removal, magnification, etc.) to amplify the text within the cropped selection. This results in a generic, repetitive process which can be applied to a broader set of error screenshots with a high level of accuracy. One embodiment includes a learning module that uses machine learning or artificial intelligence (AI) to learn about new error markers and associated metadata, and then later uses the error marker knowledge to effectively extract error text from other sets of error images—over time this is able to cover all types of error screen shots with fairly accurate extraction of error text, which in turn will enable quicker resolution of the software or application configuration error.

Figure 6:
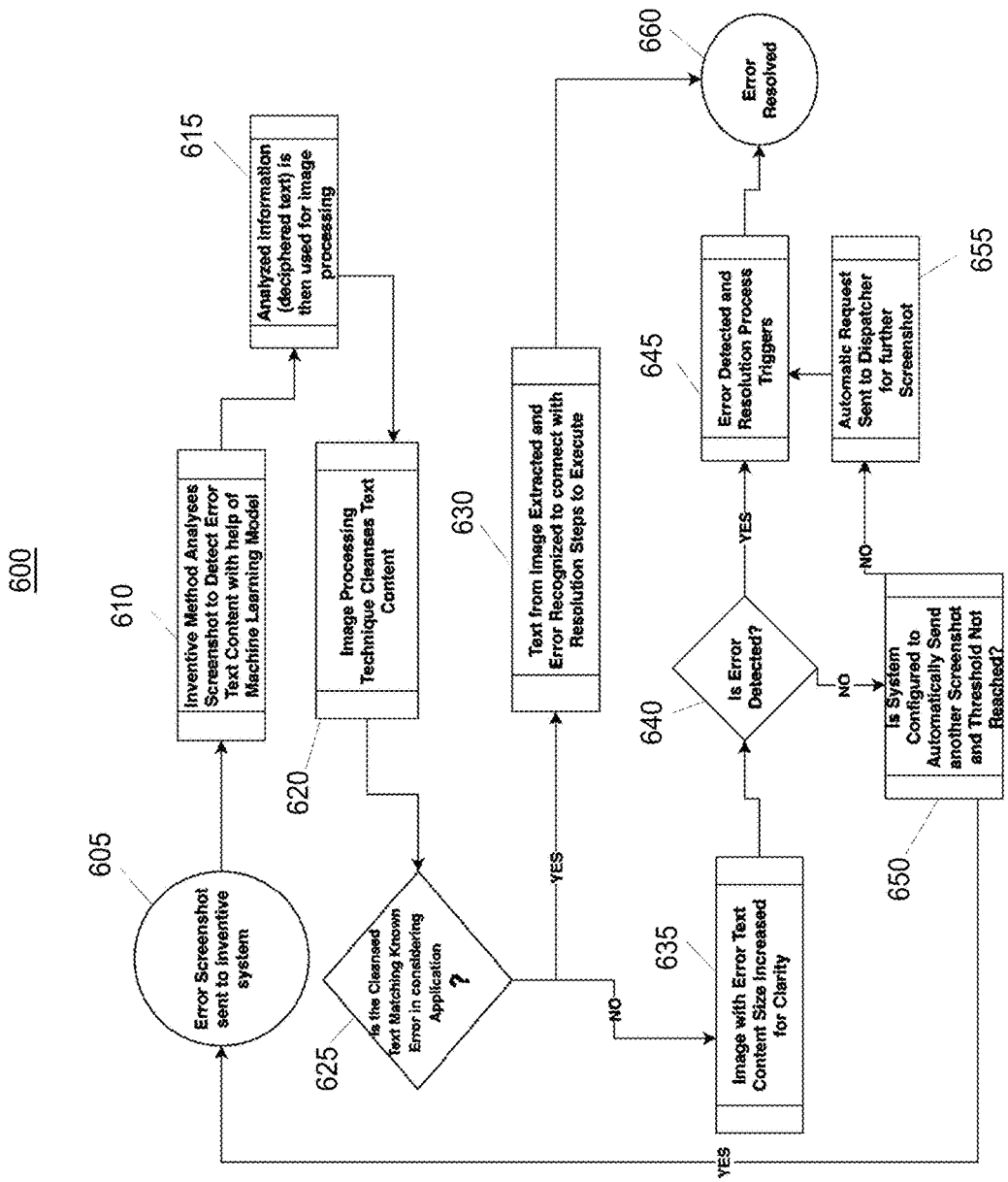
FIG. 6 is a block diagram illustrating a flow for determining an application error from a screenshot based on machine learning image analysis processing, according to one embodiment.

FIG. 6 is a block diagram illustrating a flow 600 for determining an application error from a screenshot based on machine learning image analysis processing, according to one embodiment. In one embodiment, the flow 600 is performed by a processor or processing system (e.g., a computing device from computing node 10, FIG. 1, hardware and software layer 60, FIG. 2, processing system 300, FIG. 3, system 400, FIG. 4, system 500, FIG. 5, system 700, GRN architecture 800, etc.). One embodiment uses a unique mechanism to detect and extract a small image segment containing error text followed by an intelligent image-to-text transfer method to decipher text from a screenshot sent in block 605 (Error screenshot sent to Inventive system) by either application support personnel or automatically with an acceptable image quality without a restriction on the size and format. In one example, IT (Information Technology) support captures a screenshot for error information and attaches it during incident reporting. The ingesting of the screenshot of application error information may be sent from email or incident, and sent/created by the application support team. In block 610 (Inventive Method Analyses Screenshot to Detect Error Text Content with help of Machine Learning Model) a trained machine learning model (e.g., models, such as a neural network (NN), a convolutional NN (CNN), a deep NN (DNN), a recurrent NN (RNN), a Long short-term memory (LSTM) based NN, gate recurrent unit (GRU) based RNN, tree-based CNN, self-attention network (e.g., an NN that utilizes the attention mechanism as the basic building block; self-attention networks have been shown to be effective for sequence modeling tasks, while having no recurrence or convolutions), BiLSTM (bi-directional LSTM), etc.) is employed for understanding error details from a screenshot by using knowledge of software (e.g., systems, applications and products)(SAP®), JAVA®, PYTHON®, NODEJS®, etc.), used in the application, for which an error screenshot is offered for reading.

In one embodiment, in block 610 the machine learning processing includes training and preparation (referred to herein as A.1) by constructing an image classifier model (e.g., a deep learning model, etc.) to check and confirm whether an incoming input screenshot (from block 605) is a valid error screen shot pertaining to a particular error category. The training input for A.1 may include a set of valid screenshots (e.g., valid SAP® error screenshots, etc.) belonging to a particular error category and a set of invalid screenshots. In one embodiment, the expected output from A.1 is a high confidence confirmation indicating the start of the subsequent processing. Next, in block 610 a visual inspection process (referred to herein as A.2) may be employed where a model is developed using a CNN image segmentation technique to identify and locate the position of the error boundary marker (error icon) within the screen of the screenshot. The training input for A.2 includes a set of sample error screenshots with labeled relative positions (offset from the left, offset from the bottom) of the error icons and other error attributes/metadata, such as color, shape, embedded edges, etc. In one embodiment, the expected output from A.2 includes screen coordinates of the error icon marker. In one embodiment, A.2 may include a visual inspection and careful rule creation involving the attributes/metadata, and applying this knowledge at runtime through several computer vision techniques (e.g., identify a probable crop area and then apply an edge detection algorithm (e.g., a Canny edge detection process that uses a multi-stage algorithm to detect a wide range of edges in images (Canny)) to extract out the inner most edge matching with the contours of the error icon/marker, and then detect and match other metadata to locate the error maker accurately within the screen image of the screenshot).

In one embodiment, block 610 then proceeds with developing a model process (referred to herein as A.3) (e.g., a CNN image segmentation technique/classifier) to locate the relative position of the error text based on a given location of an error icon marker. The training input for A.3 includes a set of error screenshots, relative location of the error markers labeled with relative placement (left, right, up, down) of the error text adjacent to the error marker. The expected output for A.3 provides which way to scan for text content once the error marker is identified.

In one embodiment, block 610 further includes applying (referred to herein as A.4) computer vision techniques to detect the crop region containing the error text—text edges are different than other edges and the model in A.3 is useful to detect the text region for A.4.

In one embodiment, block 610 further includes developing a knowledge model (referred to herein as A.5) to suggest the optimal mix of image enhancement (e.g., black and white enhancement, grayscale enhancement, contrast enhancement, etc.), noise cancellation (color noise elimination, line edge removal, etc.), amplification factor (e.g., a value in the scale of 1-10) to improve a final optical character recognition (OCR) result. In one embodiment, the factors (amplification, contrast) follows a relationship with deciphered OCR text accuracy and they yield a very good result for a specific value of these factors. These factors may vary from one image type to other, e.g., for an SAP® error screenshot 6 is the key value for amplification that ensures 90-100% OCR accuracy. In one embodiment, the training input for A.5 is a set of labeled data containing the image type, cropped region, image enhancement algorithm, and an applied amplification factor along with extracted OCR accuracy. In one embodiment, the expected output, given an image type and cropped error text region, suggests pertinent image processing algorithms to apply on the cropped error region to obtain the desired result.

In one embodiment, for an SAP® system, block 610 may include a computer vision based process (referred to herein as A.6) which applies relevant processing on the cropped error region to obtain an accurate result.

In one embodiment, block 610 further includes the following execution processing portions (referred to herein as B1-B9). Block 610 processing includes execution processing B1: obtaining the image screenshot and verifying the appropriateness using the model created in A.1. Next, in execution processing B.2: the model in A.2 is used to locate the center of the error marker. In execution processing B.3: the model in A.3 is then applied to identify the orientation of error text relative to the error marker. In execution processing B.4: A.4 processing is then applied to identify the crop boundary of the error text. In execution processing B.5:

A.5 processing is then applied to determine an appropriate processing technique, and enhancement factors to be applied on the cropped region. In execution processing B.6: processing continues with cropping of the region as per the execution processing B.4 suggestion and then applying the enhancements as suggested in execution processing B.5. In execution processing B.7: processing of the image includes passing the image through OCR to obtain the desired error text. In execution processing B.8: the image is processed on the error text to retrieve an appropriate resolution. In execution processing B.9: if the text content is still not proper, block 610 provides communication (e.g., messaging, text, simulated voice, email, text message, etc.) to ask the sender to obtain a screenshot and send it once again in block 605.

In one embodiment, as described above, block 610 provides for analyzing the screenshot (e.g., finds the error markers, detects the error region using the marker metadata, locates the boundary pointers, crops the image as per the contour) for deciphering the text in it. To recognize the screenshot with application specific error information, the processing refers to machine learning model(s). In one embodiment, in block 615 (Analyzed information (deciphered text) is then used for image processing) the deciphered text is added into an image processing system to apply various enhancing technique to remove the color and visual noise while enhancing the textual information within the image segment. In one embodiment, in block 620, an image processing technique is used to cleanse text content. For example, the classic computer vision has data/image filters, moving average and image segmentation, etc. to cleanse the background of an image and for augmenting clarity of the target portion of the image. In one embodiment, the image processing technique uses computer vision to crop out error text from an uninstructed screenshot with random position of error text inside a marker boundary, with proprietary format, specific to different software applications. In one embodiment, an image magnification technique is employed when there is a problem in clarity, which assists in reading the error text. In one embodiment, an objective here is to retain and enhance only the text edges in the cropped section by removing all unwanted edges and other contributing factors from the image, which may affect the final output of the OCR process negatively. In one embodiment, processing may include the following—a) Convert the image to Gray/Black and white to remove color noise; b) Apply edge (e.g., Canny) detection processing to detect edges in the image; c) Apply object recognition processing to detect text edges from the given contours; d) Dissolve non-text edges within the image to retain only the text contours; e) Enhance the clarity by increasing the contrast; and f) Apply upscaling (magnification) to improve the accuracy of the OCR output.

In one embodiment, in block 625, the flow 600 processing includes determining if the cleansed text matches a known error in the considered application. If the cleansed text matches a known error, the flow 600 proceeds to block 630. Otherwise, the flow 600 processing proceeds to block 635.

In one embodiment, in block 630 (text from image extracted and error recognized to connect with resolution steps to execute) image-to-text extraction processing is applied on the resulting image and accuracy is measured. If the error is recognized, the flow 600 proceeds to block 660 where the error determination is processed for resolution. If the prediction accuracy does not meet a required accuracy threshold level, the flow 600 proceeds to block 635 where the image with the error text content size is increased for clarity using a screenshot magnification technique to augment image visibility to correctly read error information and predict a root cause of an error. In block 640 the flow 600 determines whether the error is now detected (using the augmented/enlarged screenshot image). If the error is detected, the flow 600 proceeds to block 645 where the error is considered detected and the resolution process is triggered; and the flow 600 then proceeds to block 660. If the error is not detected, the flow 600 proceeds to block 650 where it is determined whether the processing system is configured to automatically send another screenshot in block 605 and whether the accuracy threshold is reached or not. If block 650 determines the processing system is configured to automatically send another screenshot and the accuracy threshold is met, the flow 600 proceeds to block 605 for reiteration. Otherwise, the flow 600 proceeds to block 655 where an automatic request is sent (e.g., email, text message, simulated voice, etc.) to a dispatcher for another screenshot image. Therefore, flow 600 may augment the screenshot image several times to increase reading accuracy of the error details. In one example embodiment, augmenting a screenshot six times has shown a significant readability of information from a screenshot. Additionally, the flow 600 may send a request to send more screenshots along with the actual error text for understanding the error markers and associated metadata if the current screenshot image is not enough and/or not accurate. This back and forth communication for further screenshot image sending for a request of some specific screenshot with a piece of information, which may clarify the details available in an earlier screenshot image. Once the extracted error text is provided, an automated or manual error resolution method or process may take necessary actions to improve the turn-around time for the application support team.

Figure 7:
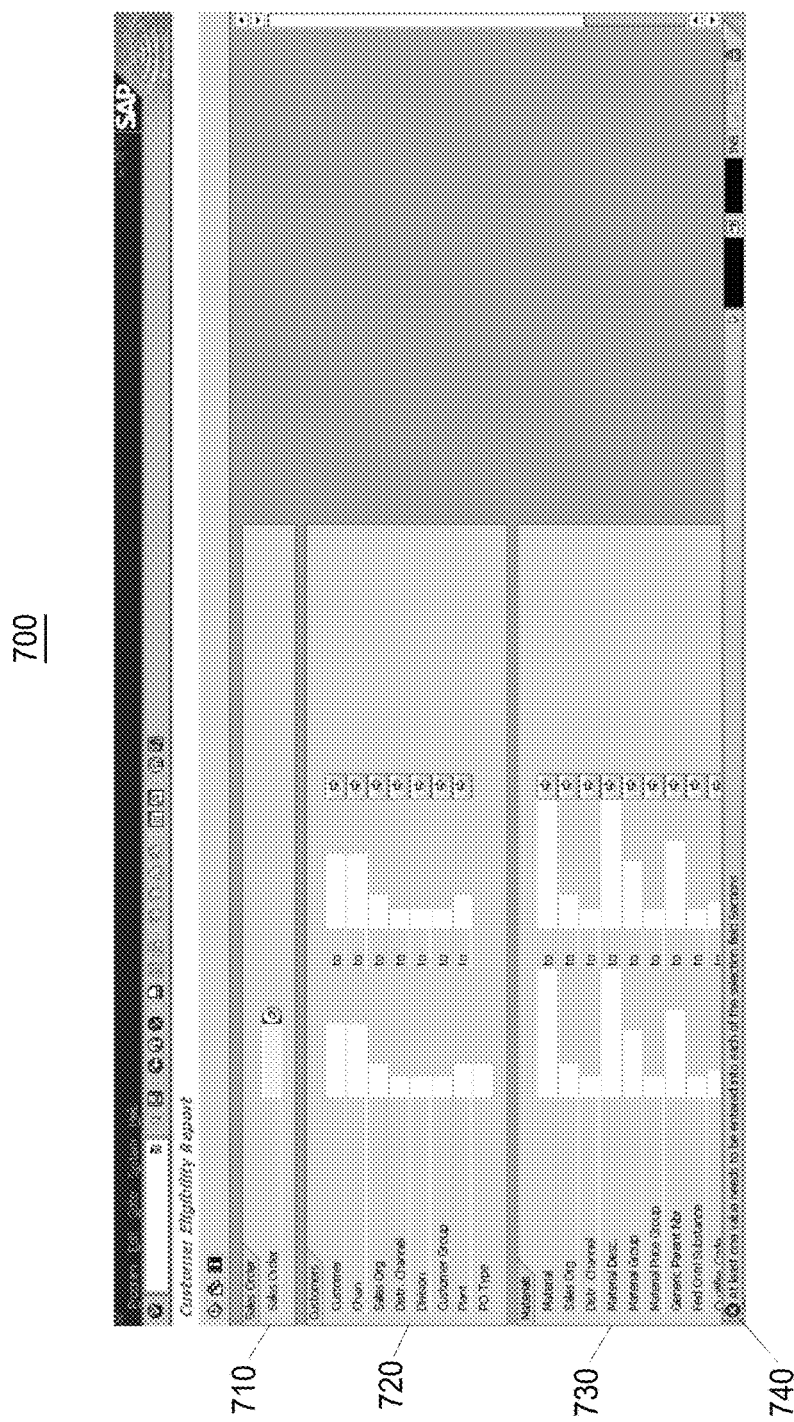
FIG. 7 is an example screenshot showing an empty field error, according to one embodiment.

FIG. 7 is an example screenshot 700 showing an empty field error 740, according to one embodiment. In this example screenshot 700 (sent at block 605, FIG. 6), the screenshot error 740 shows an icon with text that can be extracted. The error icon for error 740 is based on the sales order fields 710, the customers information fields 720 and materials fields 730 each being empty of data/content. From the error 740 information, the flow 600 (FIG. 6) detects the error 740 with block 610 (FIG. 6) and deciphers the text in block 615 (FIG. 6). In block 625 (FIG. 6) the extracted text is determined to match a known error (i.e., original or current content) in the application that outputted the example screenshot 700. In block 630 (FIG. 6) the processing flow 600 extracts the error text as "At least one value needs to be entered into each of the selection field Sections." The processing flow 600 then proceeds to block 660 (FIG. 6) to resolve the empty field error 740. The processing flow 600 uses machine learning (e.g., for detecting a similar or the same error condition) for future processing.

Figure 8:
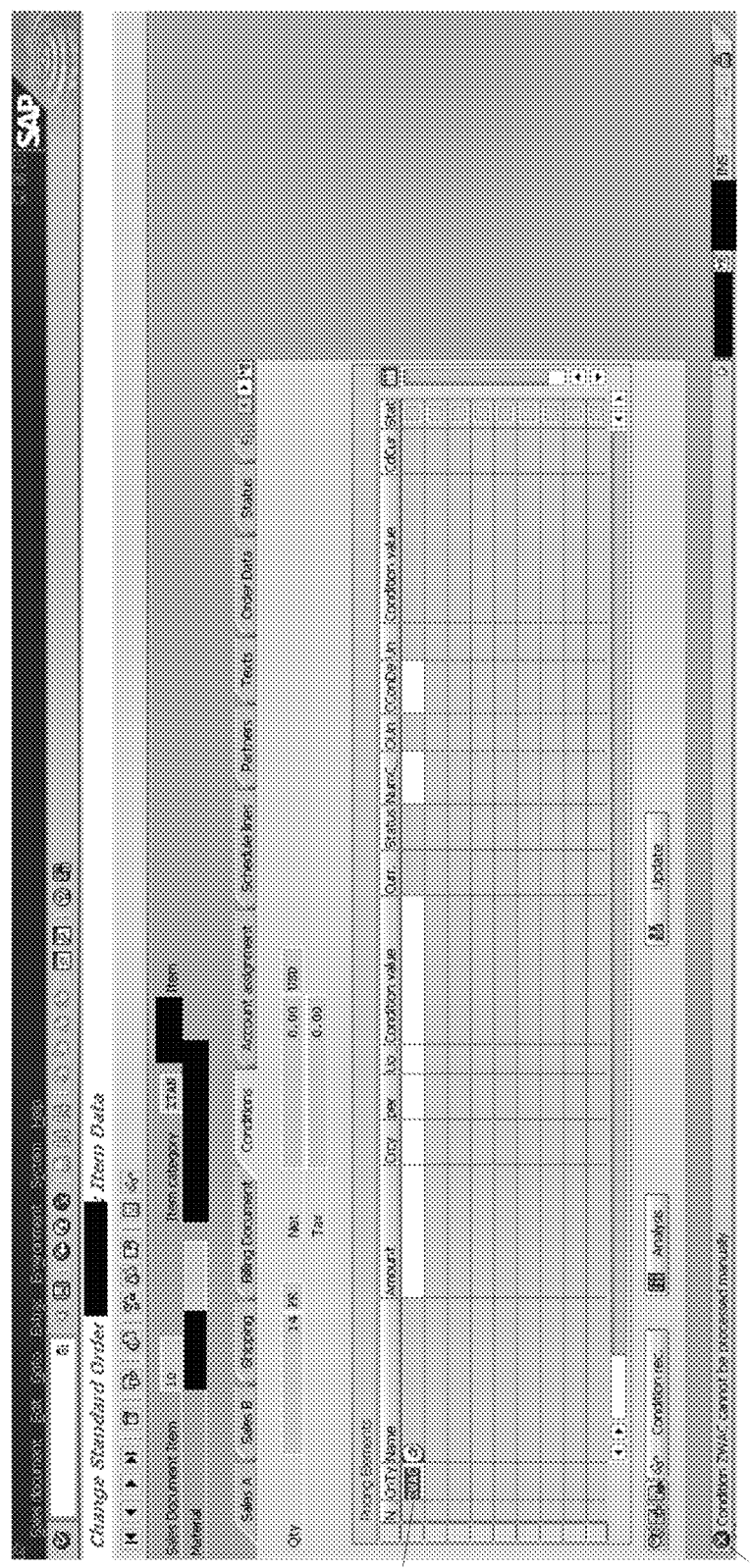
FIG. 8 is an example screenshot showing an error condition, according to one embodiment.

FIG. 8 is an example screenshot 800 showing an error condition 820, according to one embodiment. In this example screenshot 800 (sent at block 605, FIG. 6), the screenshot error 820 shows an icon with text that can be extracted. The error icon for error 820 is based on the sales pricing elements fields that includes a condition type (CnTy) field 810 that includes the term "ZWAC." From the error 820 information, the flow 600 (FIG. 6) detects the error 820 with block 610 (FIG. 6) and deciphers the text in block 615 (FIG. 6). In block 625 (FIG. 6) the extracted text is determined to match a known error (i.e., original or current content) in the application that outputted the example screenshot 800. In block 630 (FIG. 6) the processing flow 600 extracts the error text as "Condition ZWAC cannot be processed manually." The processing flow 600 then proceeds to block 660 (FIG.

6) to resolve the condition type error 820. The processing flow 600 uses machine learning (e.g., for detecting a similar or the same error condition) for future processing.

Figure 9:
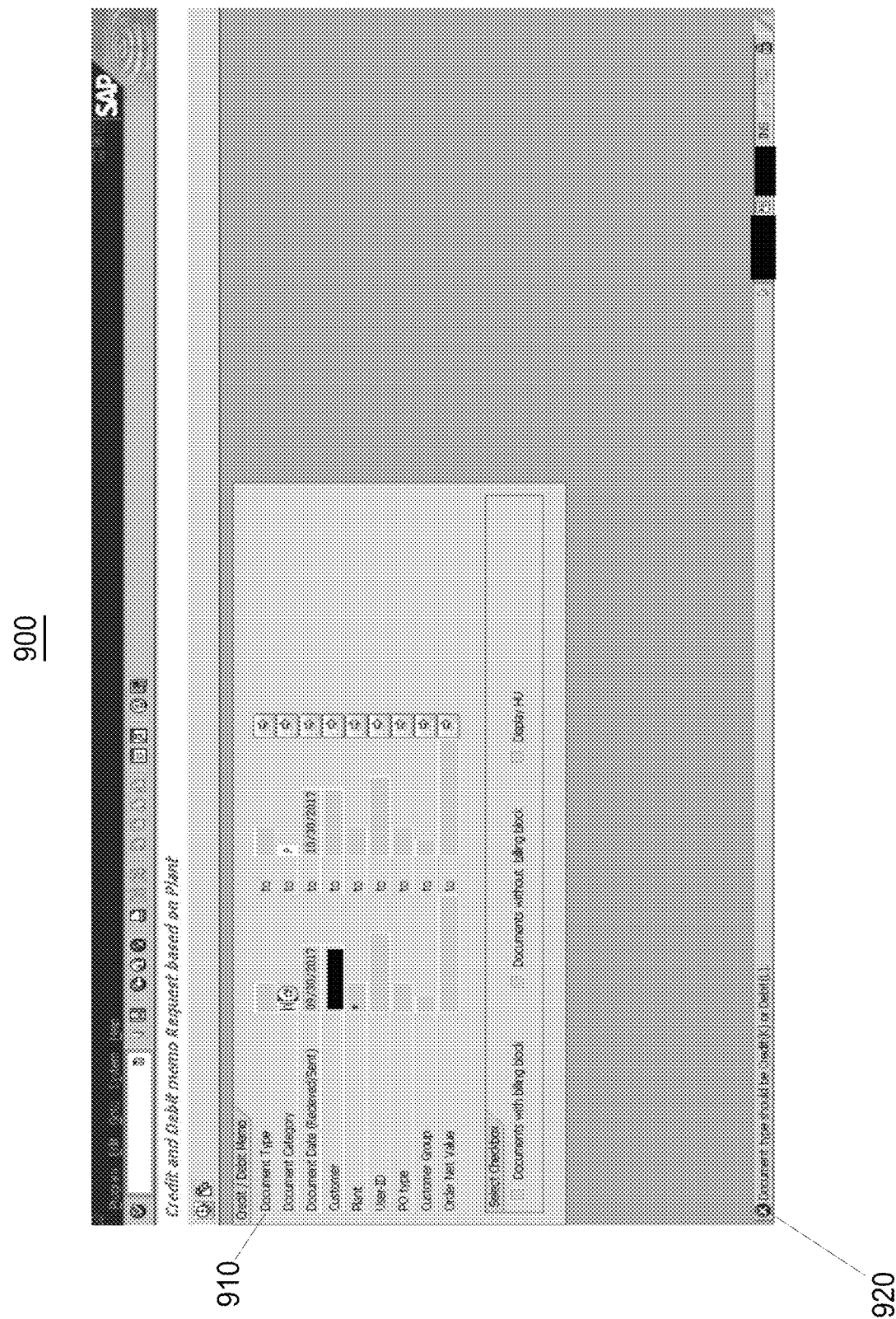
FIG. 9 is an example screenshot showing a document type error, according to one embodiment.

FIG. 9 is an example screenshot 900 showing a document type error, according to one embodiment. In this example screenshot 900 (sent at block 605, FIG. 6), the screenshot error 920 shows an icon with text that can be extracted. The error icon for error 920 is based on the document type field 910 that is empty. From the error 920 information, the flow 600 (FIG. 6) detects the error 920 with block 610 (FIG. 6) and deciphers the text in block 615 (FIG. 6). In block 625 (FIG. 6) the extracted text is determined to match a known error (i.e., original or current content) in the application that outputted the example screenshot 900. In block 630 (FIG. 6) the processing flow 600 extracts the error text as "Document type should be Credit(K) or Debit(L)." The processing flow 600 then proceeds to block 660 (FIG. 6) to resolve the condition type error 920. The processing flow 600 uses machine learning (e.g., for detecting a similar or the same error condition) for future processing.

Figure 10:
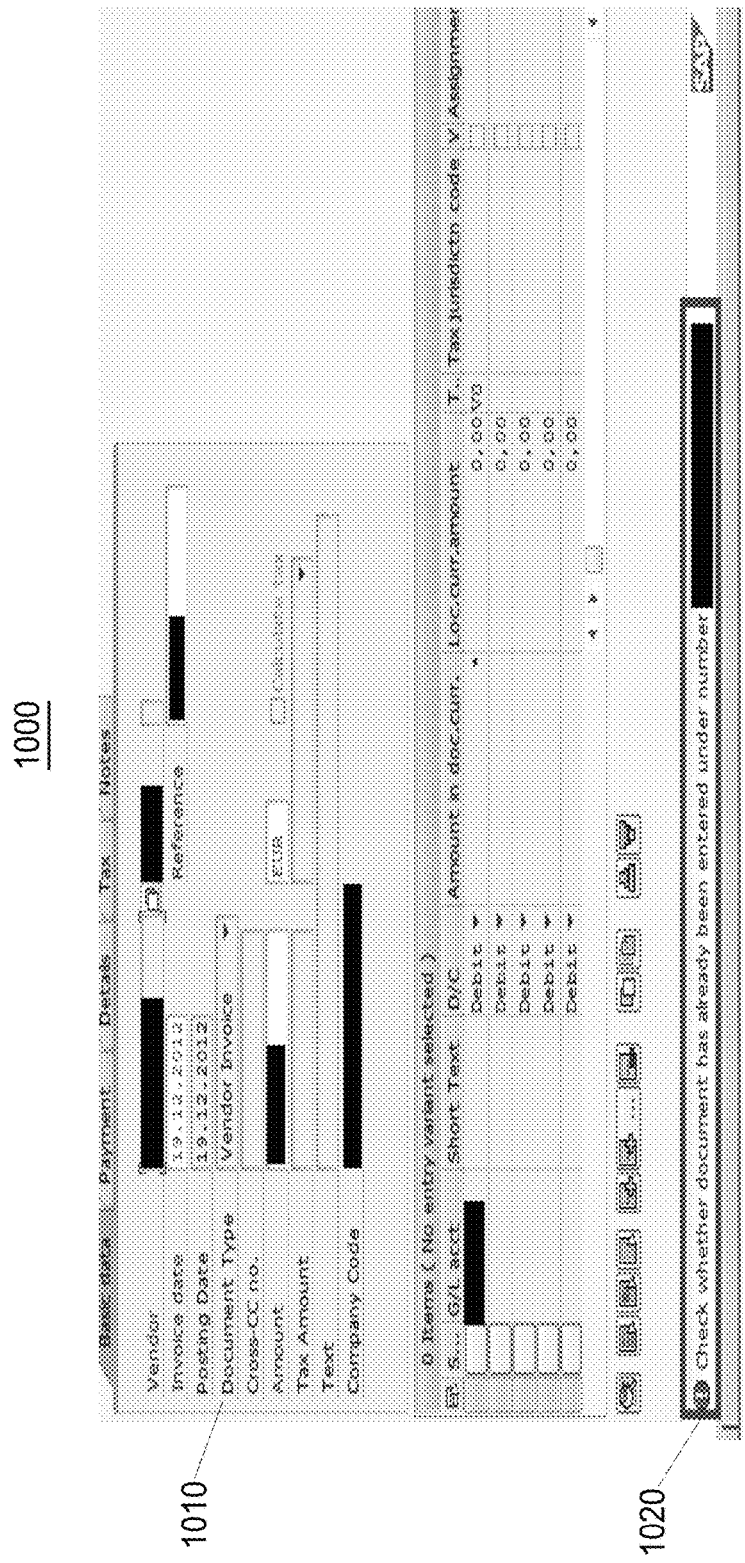
FIG. 10 is an example screenshot showing an error check condition, according to one embodiment.

FIG. 10 is an example screenshot 1000 showing an error 1020 check condition, according to one embodiment. In this example screenshot 1000 (sent at block 605, FIG. 6), the screenshot error 1020 shows an icon with text that can be extracted. The error icon for error 1020 is based on the document type field 1010 that is set to Vendor Invoice. From the error 1020 information, the flow 600 (FIG. 6) detects the error 1020 with block 610 (FIG. 6) and deciphers the text in block 615 (FIG. 6). In block 625 (FIG. 6) the extracted text is determined to partially match a known error (i.e., original or current content) in the application that outputted the example screenshot 1000. In block 630 (FIG. 6) the processing flow 600 extracts the error text as "Check whether document has already been entered under number XXXXXXX." The flow 600 determines that the error 1020 has a different background color theme, a different gradient color, and a different icon than prior known screenshots and errors. In block 630 (FIG. 6) it is determined that the prediction accuracy meets a required accuracy threshold level. Therefore, the processing flow 600 then proceeds to block 660 (FIG. 6) to resolve the condition type error 1020. The processing flow 600 uses machine learning (e.g., for detecting a similar or the same error condition) for future processing.

Figure 11:
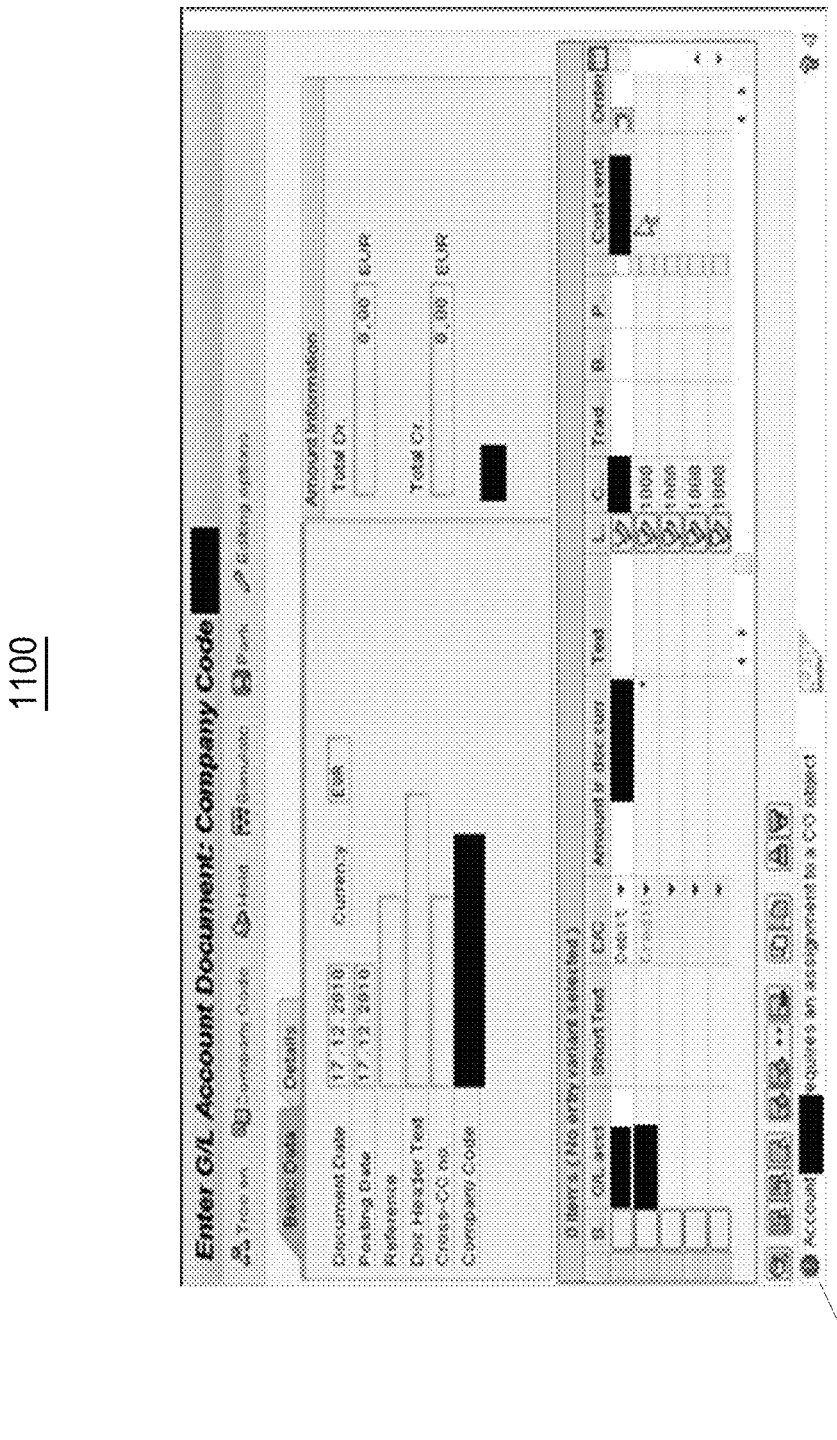
FIG. 11 is an example screenshot showing an account assignment error condition, according to one embodiment.

FIG. 11 is an example screenshot 1100 showing an account assignment error 1110 condition, according to one embodiment. In this example screenshot 1100 (sent at block 605, FIG. 6), the screenshot error 1110 shows an icon with text that can be extracted. The error icon for error 1110 is based on the account information. From the error 1110 information, the flow 600 (FIG. 6) detects the error 1110 with block 610 (FIG. 6) and deciphers the text in block 615 (FIG. 6). In block 625 (FIG. 6) the extracted text is determined to match a known error (i.e., original or current content) in the application that outputted the example screenshot 1100. In block 630 (FIG. 6) the processing flow 600 extracts the error text as "Account XXXXX requires an assignment to a CO object" (CO refers to a cost object). The flow 600 determines that the error 1110 and screenshot 1100 has a poor quality, noise, a different icon, and different fonts than prior screenshots and known errors. In block 630 (FIG. 6) it is determined that the prediction accuracy still meets a required accuracy threshold level. Therefore, the processing flow 600 then proceeds to block 660 (FIG. 6) to resolve the condition type error 1110. The processing flow 600 uses machine learning (e.g., for detecting a similar or the same error condition) for future processing.

Figure 12:
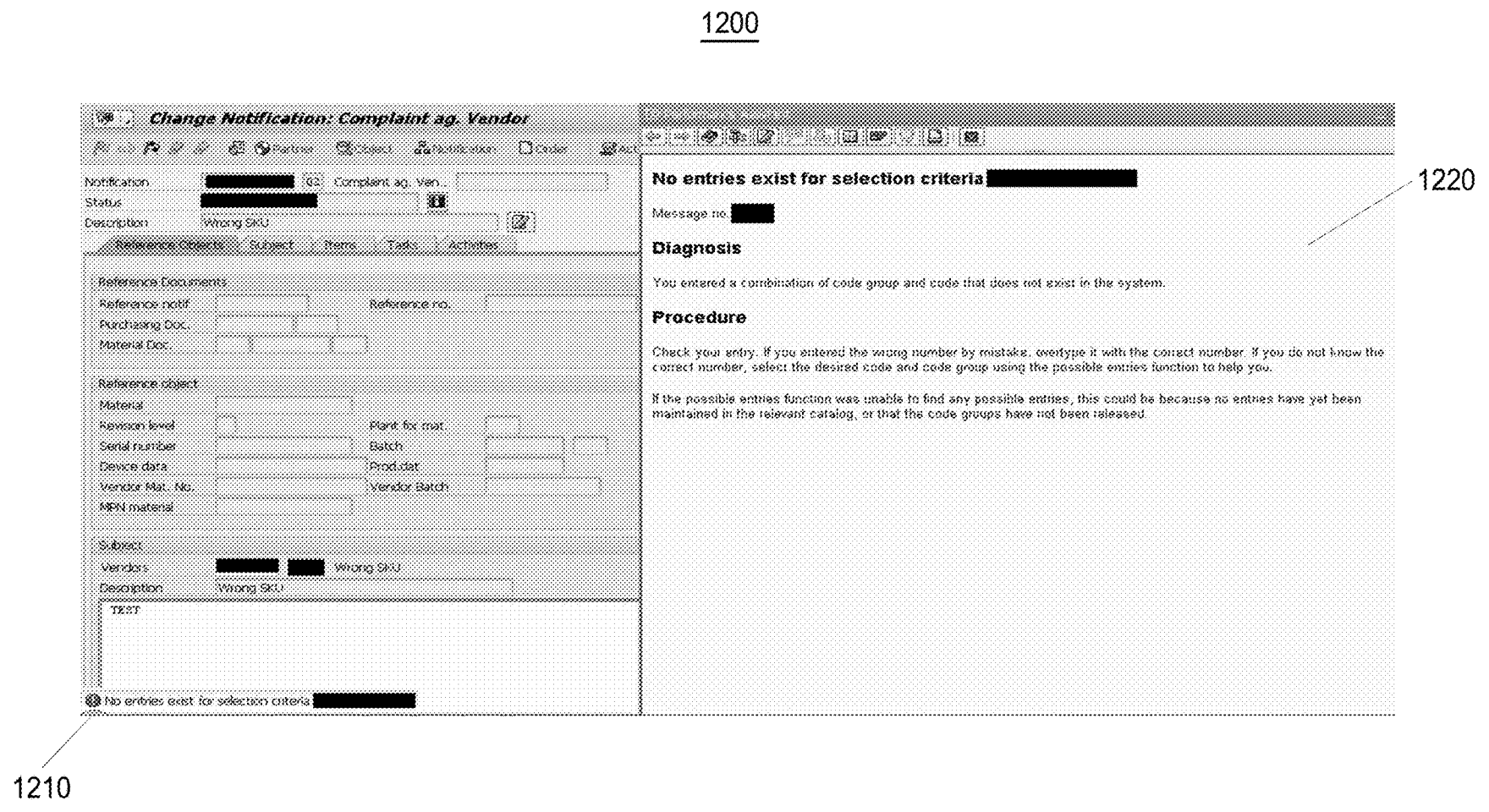

FIG. 12 is an example screenshot 1200 showing a no entry exist error 1210 for selection criteria, according to one embodiment. In this example screenshot 1200 (sent at block 605, FIG. 6), the screenshot error 1210 shows an icon with text that can be extracted. The error icon for error 1210 is based on the vendors information field. From the error 1210 information, the flow 600 (FIG. 6) detects the error 1210 with block 610 (FIG. 6) and deciphers the text in block 615 (FIG. 6). In block 625 (FIG. 6) the extracted text is determined to match a known error (i.e., original or current content) in the application that outputted the example screenshot 1200. In block 630 (FIG. 6) the processing flow 600 extracts the error text as "No entries exist for selection criteria XXXX." The flow 600 determines that the error 1210 and screenshot 1200 has a different screen size, a different format, and an overlapping section 1220 than prior known screenshots and errors. In block 630 (FIG. 6) it is determined that the prediction accuracy still meets a required accuracy threshold level. Therefore, the processing flow 600 then proceeds to block 660 (FIG. 6) to resolve the condition type error 1210. The processing flow 600 uses machine learning (e.g., for detecting a similar or the same error condition) for future processing.

Figure 13:
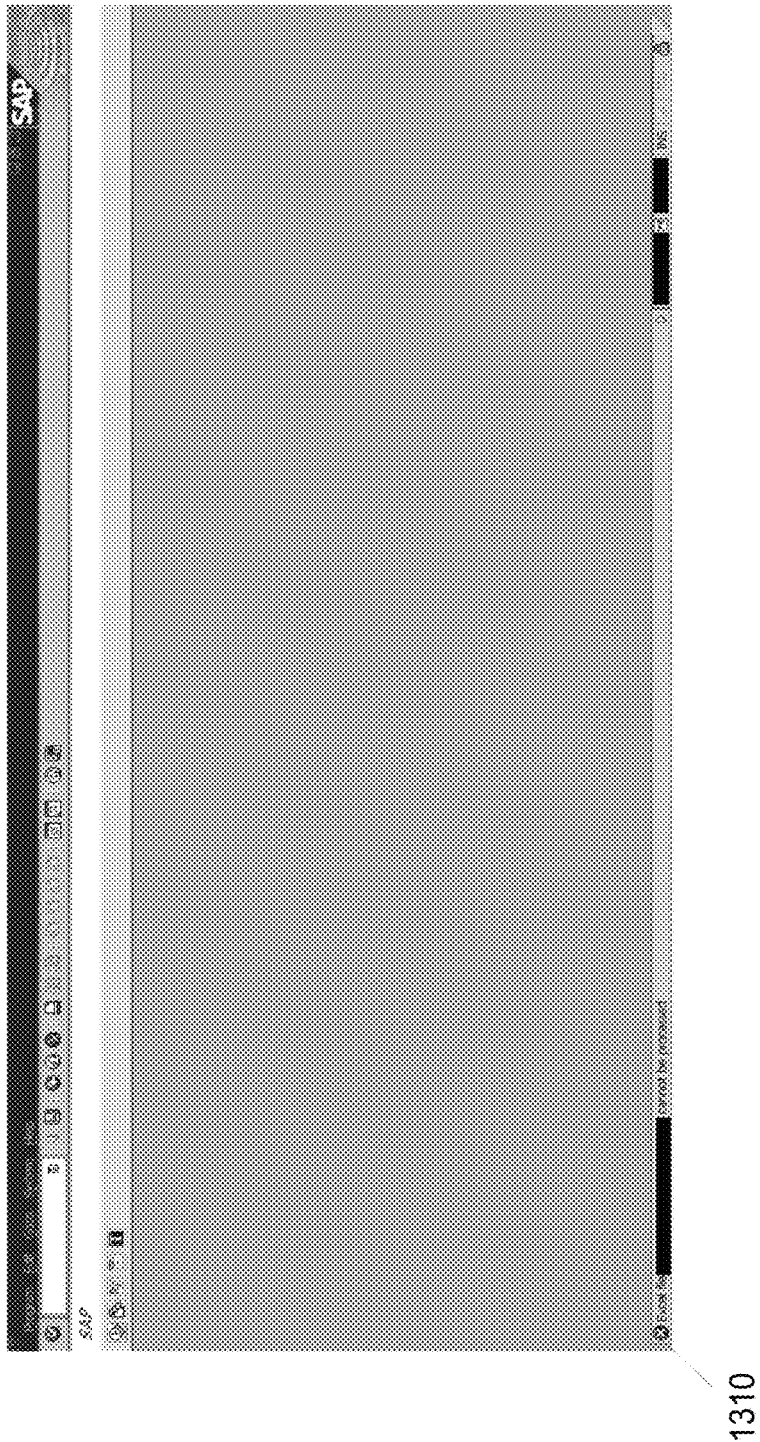
FIG. 13 is an example screenshot showing a file processing error condition, according to one embodiment.

FIG. 13 is an example screenshot 1300 showing a file processing error 1310 condition, according to one embodiment. In this example screenshot 1300 (sent at block 605, FIG. 6), the screenshot error 1310 shows an icon with text that can be extracted. The error icon for error 1310 is based on failing to be able to process an EXCEL® file. From the error 1310 information, the flow 600 (FIG. 6) detects the error 1310 with block 610 (FIG. 6) and deciphers the text in block 615 (FIG. 6). In block 625 (FIG. 6) the extracted text is determined to match a known error (i.e., original or current content) in the application that outputted the example screenshot 1300. In block 630 (FIG. 6) the processing flow 600 extracts the error text as "Excel file XXXX cannot be processed." The flow 600 determines that the error 1310 and screenshot 1300 matches prior known screenshots and errors. In block 630 (FIG. 6) it is determined that the prediction accuracy met a required accuracy threshold level. Therefore, the processing flow 600 then proceeds to block 660 (FIG. 6) to resolve the condition type error 1310. The processing flow 600 uses machine learning (e.g., for detecting a similar or the same error condition) for future processing.

Figure 14:
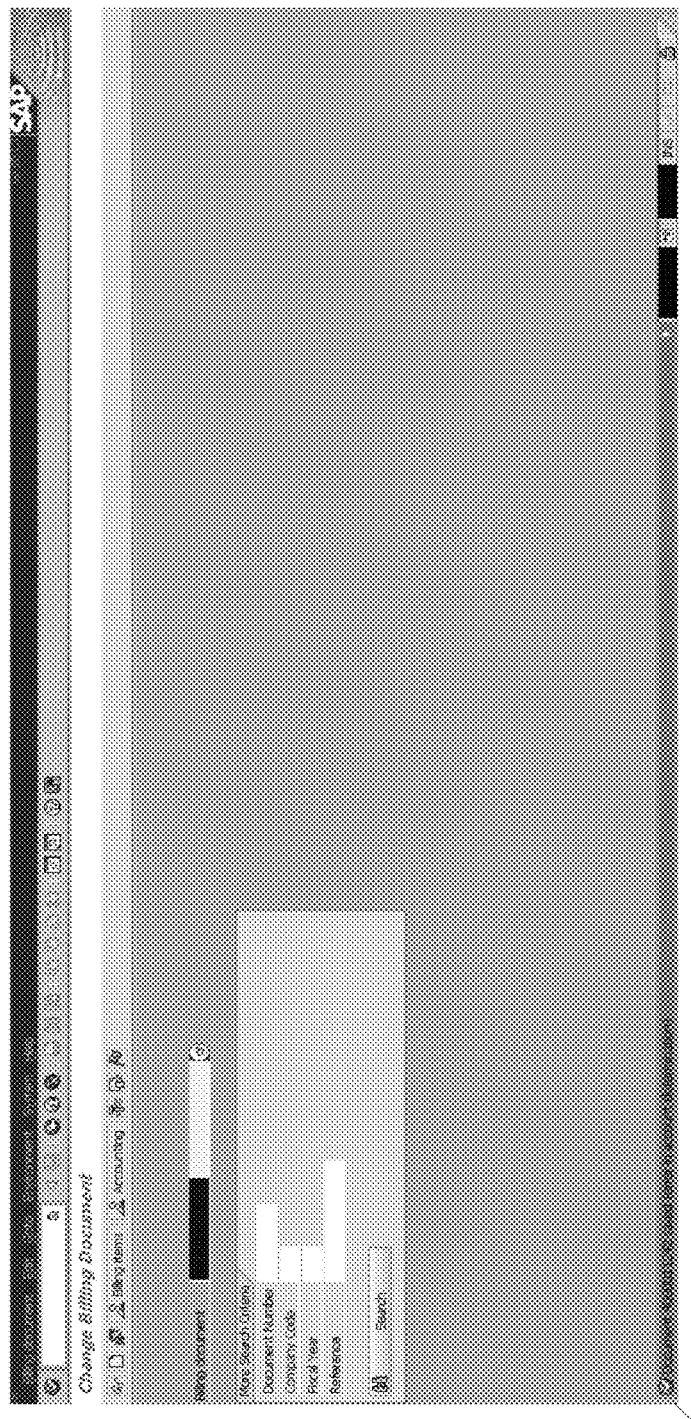
FIG. 14 is an example screenshot showing use of a different marker for non-error conveyance, according to one embodiment.

FIG. 14 is an example screenshot 1400 showing use of a different icon 1410 or marker for non-error conveyance, according to one embodiment. In this example screenshot 1400 (sent at block 605, FIG. 6), the screenshot non-error 1410 shows an icon with text that can be extracted. The non-error icon 1410 in the example screenshot 1400 indicates that a document 4000011242 was saved, but there is additional information regarding an error in the account determination. Since there was not an error condition from saving the file, text extraction for matching is not required. Since, however, the non-error message showed a different icon or marker 1410 to convey the non-error information, the processing flow 600 uses machine learning (e.g., for detecting a similar or the same non-error condition) for future processing.

Figure 15:
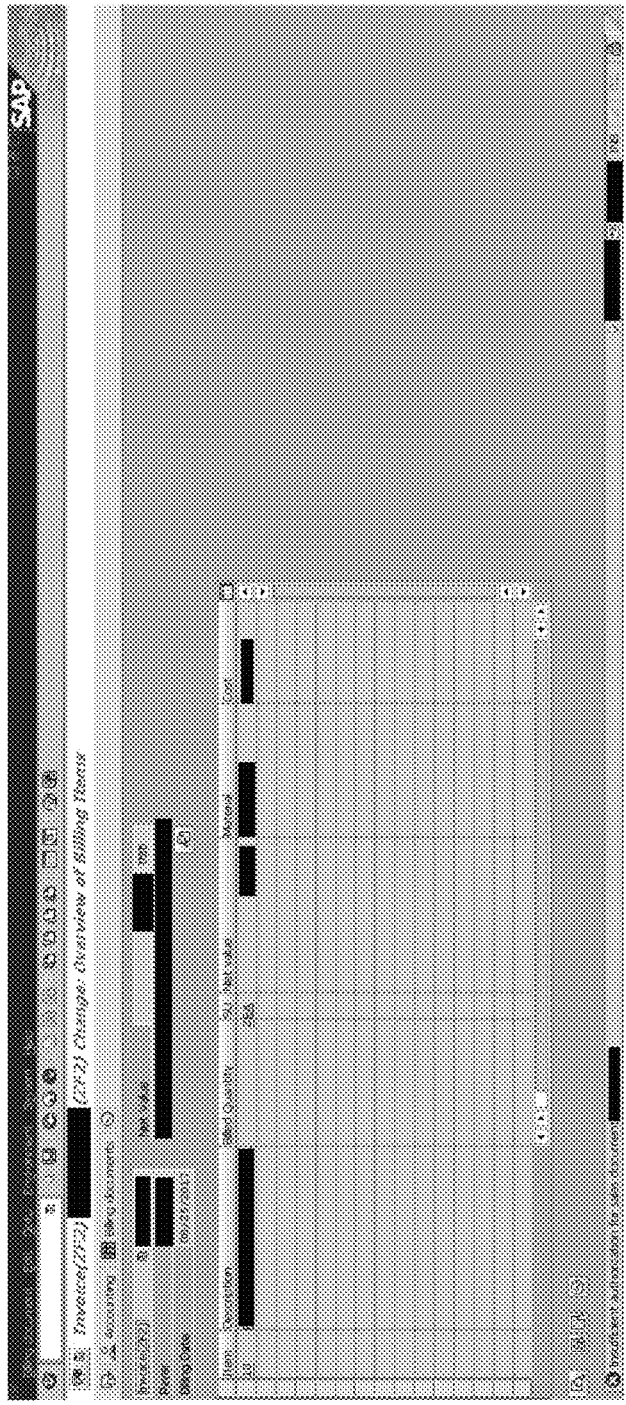
FIG. 15 is an example screenshot showing an insufficient authorization for a document error condition, according to one embodiment.

FIG. 15 is an example screenshot 1500 showing an insufficient authorization for a document error 1510 condition, according to one embodiment. In this example screenshot 1500 (sent at block 605, FIG. 6), the screenshot error 1510 shows an icon with text that can be extracted. The error icon for error 1510 is based on an authorization failure for the sales document that is being attempted to be modified.

From the error 1510 information, the flow 600 (FIG. 6) detects the error 1510 with block 610 (FIG. 6) and deciphers the text in block 615 (FIG. 6). In block 625 (FIG. 6) the extracted text is determined to match a known error (i.e., original or current content) in the application that outputted the example screenshot 1500. In block 630 (FIG. 6) the processing flow 600 extracts the error text as "Insufficient authorization for sales document XXXX." The processing flow 600 then proceeds to block 660 (FIG. 6) to resolve the authorization error 1510. The processing flow 600 uses machine learning (e.g., for detecting a similar or the same error condition) for future processing.

Figure 16:
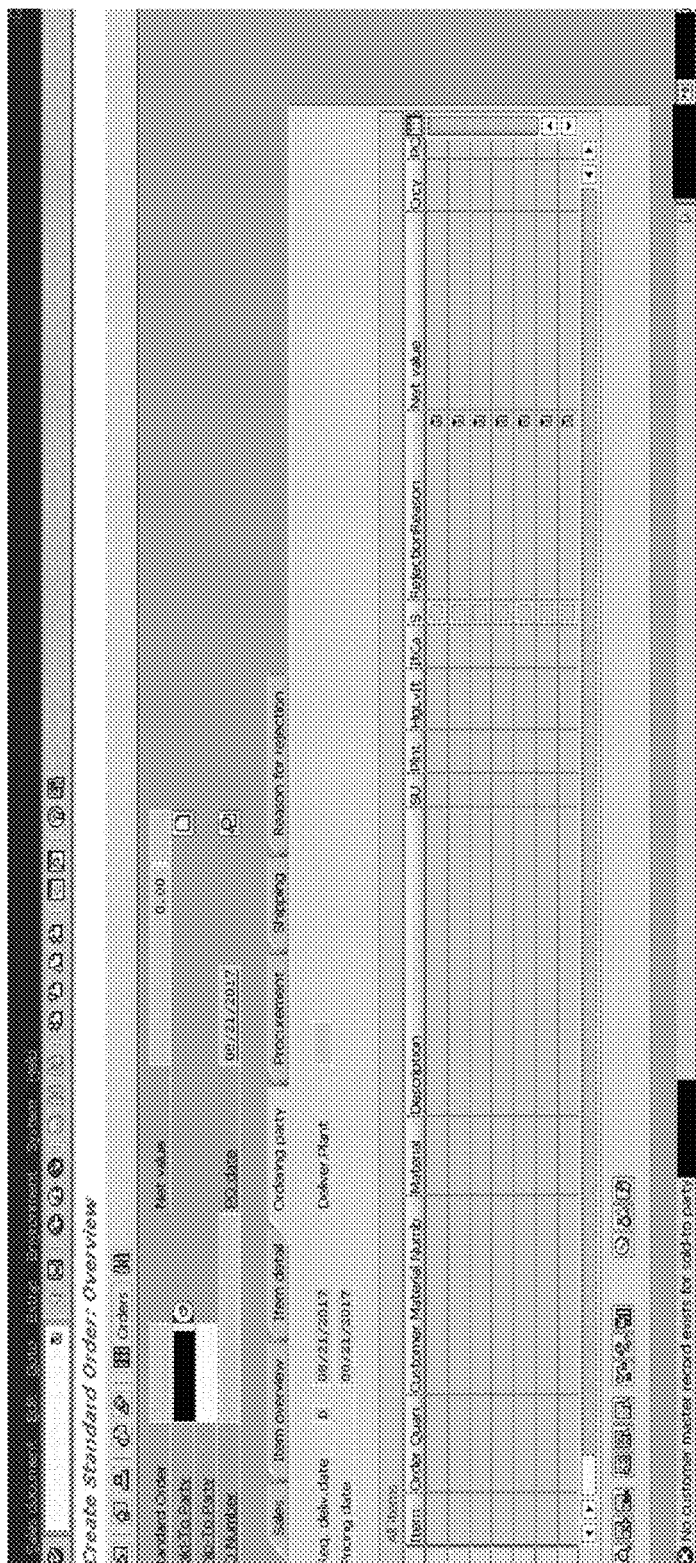
FIG. 16 is an example screenshot showing a no master record exists error condition, according to one embodiment.

FIG. 16 is an example screenshot 1600 showing a no master record exists error 1620 condition, according to one embodiment. In this example screenshot 1600 (sent at block 605, FIG. 6), the screenshot error 1620 shows an icon with text that can be extracted. The error icon for error 1620 is based on not having a customer master record available for the sold-to party field 1610. From the error 1620 information, the flow 600 (FIG. 6) detects the error 1620 with block 610 (FIG. 6) and deciphers the text in block 615 (FIG. 6). In block 625 (FIG. 6) the extracted text is determined to match a known error (i.e., original or current content) in the application that outputted the example screenshot 1600. In block 630 (FIG. 6) the processing flow 600 extracts the error text as "No customer master record exists for sold-to party XXXX." The processing flow 600 then proceeds to block 660 (FIG. 6) to resolve the error 1620. The processing flow 600 uses machine learning (e.g., for detecting a similar or the same error condition) for future processing.

Figure 17:
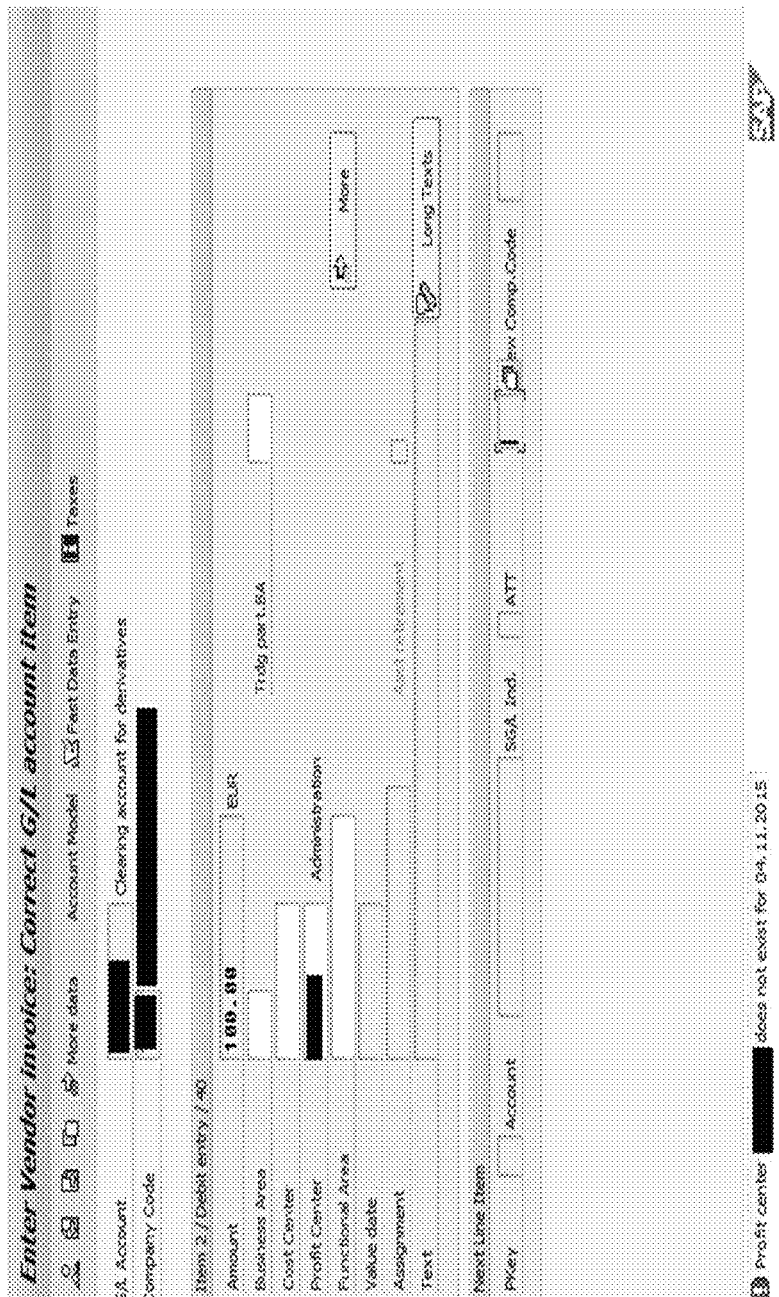
FIG. 17 is an example screenshot showing a non-existent center error condition, according to one embodiment.

FIG. 17 is an example screenshot 1700 showing a non-existent center error 1720 condition, according to one embodiment. In this example screenshot 1700 (sent at block 605, FIG. 6), the screenshot error 1720 shows an icon with text that can be extracted. The error icon for error 1720 is based on the profit center field 1710. From the error 1720 information, the flow 600 (FIG. 6) detects the error 1720 condition with block 610 (FIG. 6) and deciphers the text in block 615 (FIG. 6). In block 625 (FIG. 6) the extracted text is determined to match a known error (i.e., original or current content) in the application that outputted the example screenshot 1700. In block 630 (FIG. 6) the processing flow 600 extracts the error text as "Profit center XXXX does not exist for 04. 1 1. 2015." The flow 600 determines that the error 1720 and screenshot 1700 has a different format, a different background color, noise and a different icon or marker than prior known screenshots and errors. In block 630 (FIG. 6) it is determined that the prediction accuracy still meets a required accuracy threshold level. Therefore, the processing flow 600 then proceeds to block 660 (FIG. 6) to resolve the condition type error 1720. The processing flow 600 uses machine learning (e.g., for detecting a similar or the same error condition) for future processing.

Figure 18:
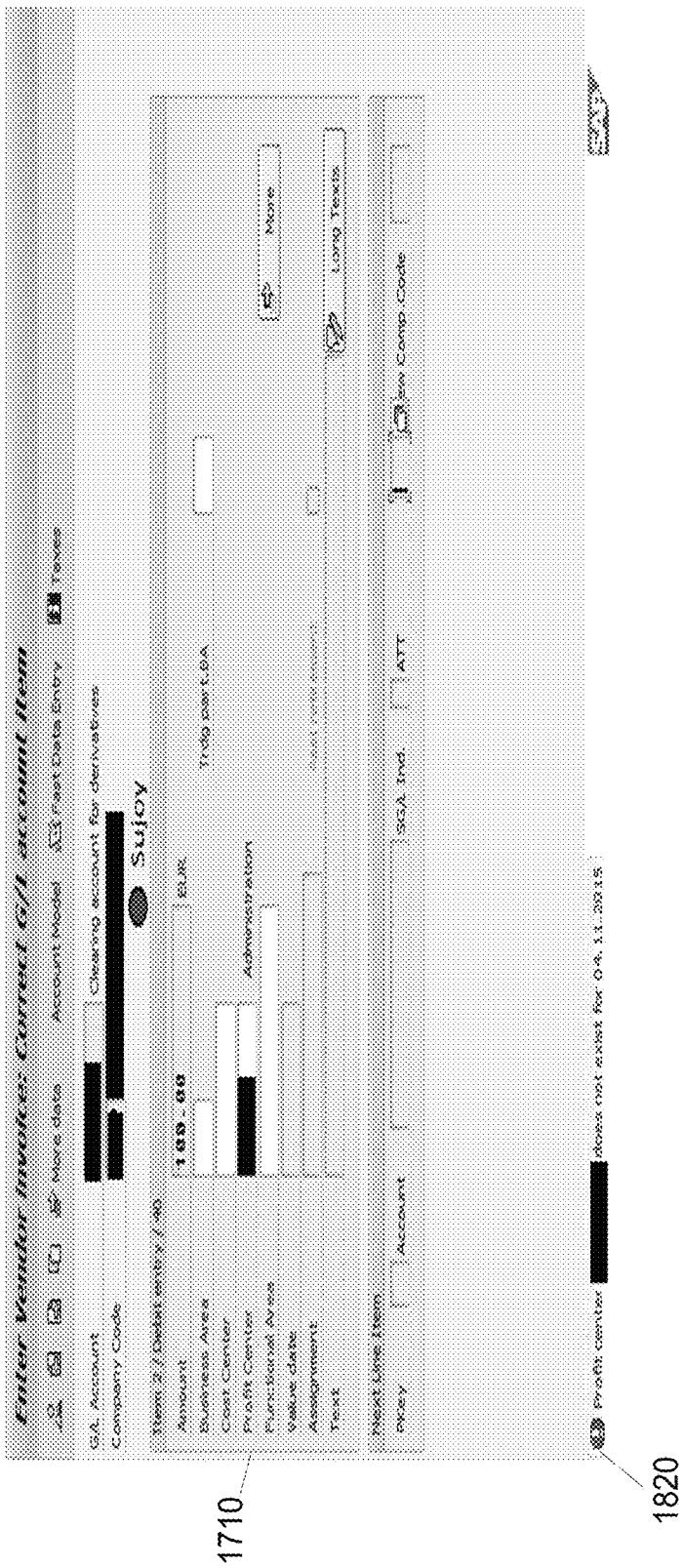
FIG. 18 is another example screenshot showing a non-existent center error condition, according to one embodiment.

FIG. 18 is another example screenshot 1800 showing a non-existent center error 1820 condition, according to one embodiment. In this example screenshot 1800 (sent at block 605, FIG. 6), the screenshot error 1820 shows an icon with text that can be extracted. The error icon for error 1820 is based on the profit center field 1710. From the error 1820 information, the flow 600 (FIG. 6) does not detect the error 1820 condition with block 610 (FIG. 6) and deciphers the text in block 615 (FIG. 6). In block 625 (FIG. 6) the extracted text ("Profit center XXXX does not exist for 04. 1 1. 2015") is determined to not match a known error in the application that outputted the example screenshot 1800. In block 635 (FIG. 6) the processing flow 600 proceeds to test artificial noise matching to check with the error indication icon contour. The processing flow 600 then proceeds to block 640 (FIG. 6) to attempt to determine the error 1820 or seek assistance (e.g., from a dispatcher, IT assistance, etc.). The processing flow 600 uses machine learning (e.g., for detecting a similar or the same error condition) for future processing.

FIG. 19 illustrates a block diagram of a process 1900 for determining an application error from a screenshot based on machine learning image analysis, according to one embodiment. In one embodiment, in block 1910 process 1900 utilizes a computing device (from computing node 10, FIG. 1, hardware and software layer 60, FIG. 2, processing system 300, FIG. 3, system 400, FIG. 4, system 500, FIG. 5, etc.) to receive a computer application screenshot image indicating a computer error has occurred (e.g., sent in block 605 and received by block 610, FIG. 6). In block 1920, process 1900 further analyzes, by the computing device, the computer application screenshot image using a machine learning image analysis (e.g., block 610) to determine one or more error regions (e.g., a portion of the screen that includes error information, an error boundary marker, icon, etc.) in the computer application screenshot image. In block 1930, process 1900 further processes, by the computing device, the analyzed computer application screenshot to extract text (e.g., in block 630, FIG. 6) from the one or more error regions in the computer application screenshot image. In block 1940, process 1900 further determines, by the computing device, the application error based upon the extracted text (e.g., in block 630). In block 1950, process 1900 further automatically applies, by the computing device, an automated error fix (or error resolution) based upon the determined application error (e.g., in block 660, FIG. 6).

In one embodiment, process 1900 may further include the feature that the machine learning image analysis includes constructing an image classifier model (i.e., a machine learning or AI model) that checks that the received computer application screenshot image is a valid error screenshot pertaining to a particular error category (e.g., based on type of application, type of error, etc.). Additionally, process 1900 may include the features that the machine learning image analysis further includes performing a visual inspection process (e.g., using computer vision processing, OCR, etc.) including creating a model using machine learning image segmentation to identify and locate a position of an error boundary marker (e.g., an icon, etc.) within the one or more error regions of the received computer application screenshot image.

In one embodiment, process 1900 may further include the feature that the machine learning image analysis further includes locating a relative position of error text using the model (e.g., the model that uses machine learning image segmentation) based on a given location of the error boundary marker. Process 1900 may yet further include the feature that the machine learning image analysis applies computer vision techniques to detect a crop region containing the error text.

In one embodiment, process 1900 may still further include the feature that the machine learning image analysis further develops a knowledge model (e.g., a machine learning or AI model) to suggest (e.g., about a suggestion or recommendation in text, sound, computer communications, etc.) an optimal mix of image enhancement, noise cancellation, and an amplification factor to improve a final OCR result for the error text.

In one embodiment, process 1900 may yet further include the features of locating a center of the error boundary marker, identify an orientation of the error text relative to the error boundary marker, identify the crop region of the error text, determine a processing technique and enhancement factors to apply enhancements on the crop region, cropping of the (determined) crop region and apply the enhancements, and pass the computer application screenshot image through OCR to obtain the error text.

In one embodiment, process 1900 may yet further include the features of determining whether a prediction accuracy meets a required accuracy threshold level, performing a screenshot magnification process to the error text that increases a content size for clarity to augment image visibility, determining whether the error text with increased content size is detected, and if the error text is not detected, automatically receive another computer application screenshot image (or send a request for one or more computer application screenshot images).

In some embodiments, the features described above contribute to the advantage of overcoming the problem with communication and resolution that results in delayed/incorrect application error resolution, consumes user and assistance personnel, interrupts schedules, etc. The features described above may further contribute to the advantage of using machine learning image analysis in specific application software as well as computer vision techniques to manifest correct error or problem information for an application from a screenshot to automate error (or problem) resolution.

One or more embodiments may be a system, method, and/or a computer program product at any possible technical detail level of integration. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalitalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated.

What is claimed is:

1. A method for determining an application error from a screenshot, the method comprising:
   receiving, by a computing device, a computer application screenshot image indicating a computer error has occurred;
   analyzing, by the computing device, the computer application screenshot image using a machine learning image analysis to determine one or more error regions in the computer application screenshot image;
   processing, by the computing device, the analyzed computer application screenshot to extract text from the one or more error regions in the computer application screenshot image;
      performing a screenshot magnification process to error text within the one or more error regions that increases a content size for clarity to augment image visibility;
      determining a processing technique and enhancement factors to apply enhancements on a detected crop region containing the error text;
      cropping the crop region and applying the enhancements;
   determining, by the computing device, the application error based upon the extracted text; and
   automatically applying, by the computing device, an automated error fix based upon the determined application error.

2. The method of claim 1, wherein the machine learning image analysis comprises:
   constructing an image classifier model that checks that the received computer application screenshot image is a valid error screenshot pertaining to a particular error category.

3. The method of claim 2, wherein the machine learning image analysis further comprises:
   performing a visual inspection process including creating a model using machine learning image segmentation to identify and locate a position of an error boundary marker within the one or more error regions of the received computer application screenshot image.

4. The method of claim 3, wherein the machine learning image analysis further comprises:
   locating a relative position of the error text using the model based on a given location of the error boundary marker.

5. The method of claim 4, wherein the machine learning image analysis further comprises:
   applying computer vision techniques to detect the crop region containing the error text.

6. The method of claim 5, wherein the machine learning image analysis further comprises:
   developing a knowledge model to suggest an optimal mix of image enhancement, noise cancellation, and an amplification factor to improve a final optical character recognition (OCR) result for the error text.

7. The method of claim 6, further comprising:
   locating a center of the error boundary marker;
   identifying an orientation of the error text relative to the error boundary marker;
   identifying the crop region of the error text; and
   passing the computer application screenshot image through OCR to obtain the error text.

8. The method of claim 7, further comprising:
   determining whether a prediction accuracy meets a required accuracy threshold level;
   determining whether the error text with increased content size is detected; and
   if the error text is not detected, automatically receive another computer application screenshot image.

9. A computer program product for determining an application error from a screenshot, the computer program product comprising a computer readable storage medium having program instructions embodied therewith, the program instructions executable by a processor to cause the processor to:
- receive, by the processor, a computer application screenshot image indicating a computer error has occurred;
- analyze, by the processor, the computer application screenshot image using a machine learning image analysis to determine one or more error regions in the computer application screenshot image;
- process, by the processor, the analyzed computer application screenshot to extract text from the one or more error regions in the computer application screenshot image;
- perform, by the processor, a screenshot magnification process to error text within the one or more error regions that increases a content size for clarity to augment image visibility;
- determine, by the processor, a processing technique and enhancement factors to apply enhancements on a crop region containing the error text;
- crop, by the processor, the crop region and applying the enhancements;
- determine, by the processor, the application error based upon the extracted text; and
- automatically apply, by the processor, an automated error fix based upon the determined application error.

10. The computer program product of claim 9, wherein the machine learning image analysis comprises:
- constructing, by the processor, an image classifier model that checks that the received computer application screenshot image is a valid error screenshot pertaining to a particular error category.

11. The computer program product of claim 10, wherein the machine learning image analysis further comprises:
- performing, by the processor, a visual inspection process including creating a model using machine learning image segmentation to identify and locate a position of an error boundary marker within the one or more error regions of the received computer application screenshot image.

12. The computer program product of claim 11, wherein the machine learning image analysis further comprises:
- locating, by the processor, a relative position of the error text using the model based on a given location of the error boundary marker; and
- applying computer vision techniques to detect the crop region containing the error text.

13. The computer program product of claim 12, wherein the machine learning image analysis further comprises:
- develop, by the processor, a knowledge model to suggest an optimal mix of image enhancement, noise cancellation, and an amplification factor to improve a final optical character recognition (OCR) result for the error text.

14. The computer program product of claim 13, wherein the program instructions executable by the processor to further cause the processor to:
- locate, by the processor, a center of the error boundary marker;
- identify, by the processor, an orientation of the error text relative to the error boundary marker;
- identify, by the processor, the crop region of the error text; and
- pass, by the processor, the computer application screenshot image through OCR to obtain the error text.

15. The computer program product of claim 14, wherein the program instructions executable by the processor to further cause the processor to:
- determine, by the processor, whether a prediction accuracy meets a required accuracy threshold level;
- determine, by the processor, whether the error text with increased content size is detected; and
- if the error text is not detected, automatically receive, by the processor, another computer application screenshot image.

16. An apparatus comprising:
a memory configured to store instructions; and
a processor configured to execute the instructions to:
- receive a computer application screenshot image indicating a computer error has occurred;
- analyze the computer application screenshot image using a machine learning image analysis to determine one or more error regions in the computer application screenshot image;
- process the analyzed computer application screenshot to extract text from the one or more error regions in the computer application screenshot image;
- perform a screenshot magnification process to error text within the one or more error regions that increases a content size for clarity to augment image visibility;
- determine a processing technique and enhancement factors to apply enhancements on a crop region containing the error text;
- crop the crop region and applying the enhancements;
- determine the application error based upon the extracted text; and
- automatically apply an automated error fix based upon the determined application error.

17. The apparatus of claim 16, wherein the machine learning image analysis comprises:
- constructing an image classifier model that checks that the received computer application screenshot image is a valid error screenshot pertaining to a particular error category;
- performing a visual inspection process including creating a model using machine learning image segmentation to identify and locate a position of an error boundary marker within the one or more error regions of the received computer application screenshot image; and
- locating a relative position of the error text using the model based on a given location of the error boundary marker.

18. The apparatus of claim 17, wherein the machine learning image analysis further comprises:
- applying computer vision techniques to detect the crop region containing the error text; and
- developing a knowledge model to suggest an optimal mix of image enhancement, noise cancellation, and an amplification factor to improve a final optical character recognition (OCR) result for the error text.

19. The apparatus of claim 18, wherein the processor is further configured to execute the instructions to:
- locate a center of the error boundary marker;
- identify an orientation of the error text relative to the error boundary marker;
- identify the crop region of the error text; and
- pass the computer application screenshot image through OCR to obtain the error text.

20. The apparatus of claim 19, wherein the processor is further configured to execute the instructions to:

determine whether a prediction accuracy meets a required accuracy threshold level;
determine whether the error text with increased content size is detected; and
if the error text is not detected, automatically receive another computer application screenshot image.

* * * * *